(12) United States Patent
Diez

(10) Patent No.: US 7,811,695 B2
(45) Date of Patent: *Oct. 12, 2010

(54) COMPOSITE BLOCK OF FUEL CELLS

(75) Inventor: Armin Diez, Lenningen (DE)

(73) Assignee: ElringKlinger AG, Dettingen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/316,421

(22) Filed: Dec. 12, 2008

(65) Prior Publication Data

US 2009/0191447 A1 Jul. 30, 2009

Related U.S. Application Data

(60) Division of application No. 10/674,202, filed on Sep. 29, 2003, now Pat. No. 7,482,084, which is a continuation of application No. 09/658,628, filed on Sep. 11, 2000, now Pat. No. 6,670,068.

(30) Foreign Application Priority Data

Sep. 9, 2000 (DE) ................................ 100 44 703

(51) Int. Cl.
*H01M 2/02* (2006.01)
(52) U.S. Cl. .............................. 429/34; 429/35; 429/38; 429/39
(58) Field of Classification Search ................... 429/34, 429/35, 38, 39, 36, 37
See application file for complete search history.

(56) References Cited

U.S. PATENT DOCUMENTS

| | | | |
|---|---|---|---|
| 4,942,099 A * | 7/1990 | Isobe et al. ................... | 429/35 |
| 5,077,148 A | 12/1991 | Schora et al. ................. | 429/16 |
| 5,232,792 A | 8/1993 | Reznikov ...................... | 429/14 |
| 5,942,348 A | 8/1999 | Jansing et al. ................. | 429/32 |
| 6,087,033 A | 7/2000 | Grune et al. ................... | 429/37 |
| 6,106,967 A * | 8/2000 | Virkar et al. ................... | 429/34 |
| 6,165,632 A | 12/2000 | Blum et al. .................... | 429/12 |
| 6,670,068 B1 | 12/2003 | Diez ............................ | 429/35 |
| 2002/0024185 A1 * | 2/2002 | Ghosh et al. ................. | 277/650 |

FOREIGN PATENT DOCUMENTS

| | | |
|---|---|---|
| CA | 2 331 740 | 5/1999 |
| DE | 40 16 157 A1 | 12/1990 |
| DE | 42 36 441 | 5/1994 |
| DE | 44 42 285 | 2/1996 |
| DE | 44 43 688 | 3/1996 |
| DE | 196 50 904 | 6/1998 |
| DE | 198 21 767 | 11/1999 |
| DE | 198 52 146 | 5/2000 |
| EP | 0 907 215 A1 | 4/1999 |
| WO | 98/35398 | 8/1998 |
| WO | 99/54131 | 10/1999 |

* cited by examiner

*Primary Examiner*—Raymond Alejandro

(57) ABSTRACT

In order to create a fuel cell unit, comprising a cathode-anode-electrolyte unit and a contact plate which is in electrically conductive contact with the cathode-anode-electrolyte unit, which requires only small production resources and is thus suitable for large-scale production it is suggested that the fuel cell unit comprise a fluid guiding element which is connected to the contact plate in a fluid-tight manner, forms a boundary of a fluid chamber having fluid flowing through it during operation of the fuel cell unit and is designed as a shaped sheet metal part.

60 Claims, 12 Drawing Sheets

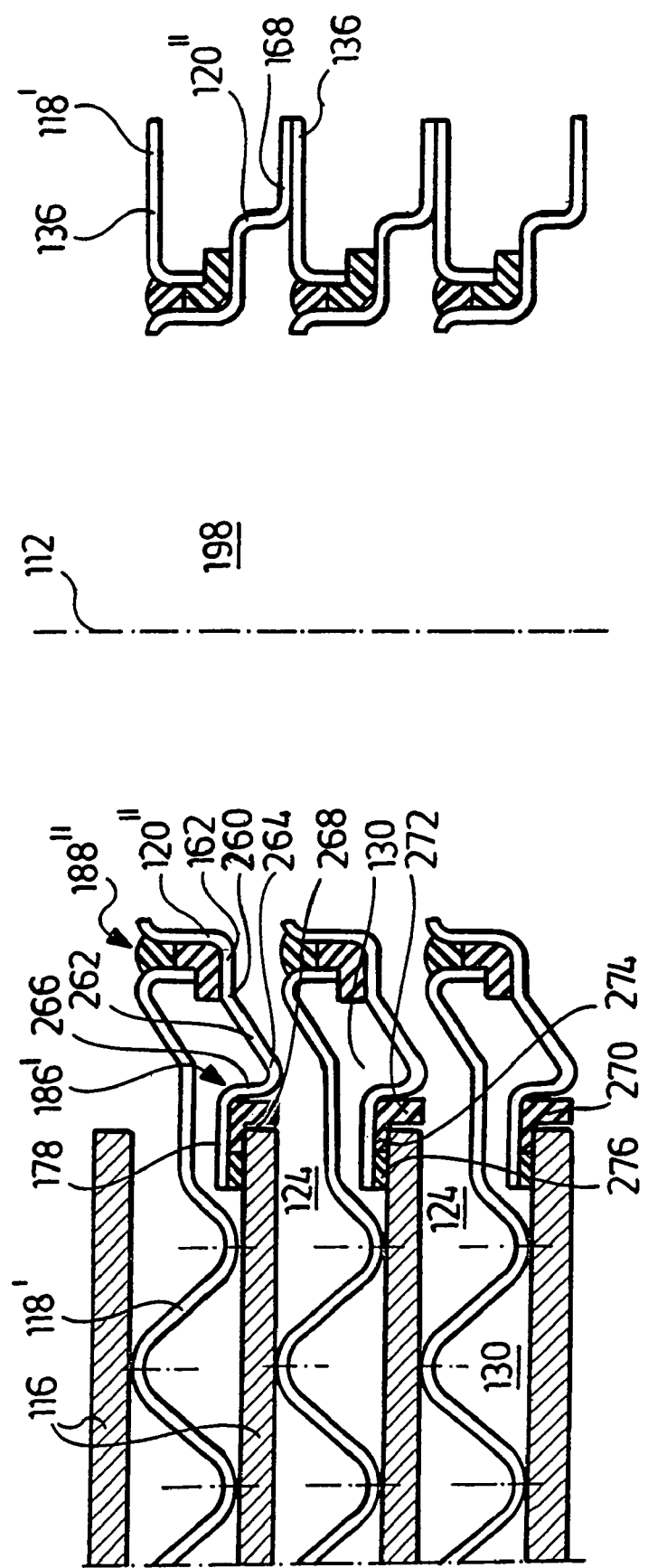

COMPOSITE BLOCK OF FUEL CELLS

This application is a divisional of application Ser. No. 10/674,202 filed Sep. 29, 2003, now U.S. Pat. No. 7,482,084, which is a continuation of application Ser. No. 09/658,628 filed Sep. 11, 2000, now U.S. Pat. No. 6,670,068, which claims priority of German application No. 100 44 703.1 filed Sep. 9, 2000.

The present invention relates to a fuel cell unit which comprises a cathode-anode-electrolyte unit and a contact plate which is in electrically conductive contact with the cathode-anode-electrolyte unit (CAE unit).

Fuel cell units of this type are known from the state of the art.

As a rule, several such fuel cell units are combined to form a composite block of fuel cells, in which the fuel cell units follow one another along a stacking direction.

In the cathode-anode-electrolyte unit, an electrochemical reaction takes place during the operation of the fuel cell unit, during the course of which electrons are supplied to the anode of the CAE unit and electrons withdrawn from the cathode of the CAE unit for the ionization of oxygen atoms. The contact plates arranged between the CAE units of two consecutive fuel cell units serve to balance the charge between the cathode of the one fuel cell unit and the anode of the adjacent fuel cell unit in order to supply the cathode with the electrons required for the ionization. Electric charges may be tapped from the edge-side contact plates of the composite block of fuel cells in order to supply them to an external useful current circuit.

The contact plates used with the known fuel cell units are metal plates which are milled or eroded from the entire plate and between which the CAE units are inserted so that these contact plates serve at the same time to hold the CAE units, as well. Furthermore, these plates are provided with channels which serve for the passage of fluids (combustible gas, oxidation agent and/or refrigerant) through the fuel cell unit.

These known fuel cell units are very complicated to produce and thus suitable only for small quantities.

The object underlying the present invention is therefore to create a fuel cell unit of the type specified at the outset which requires only small production resources and is thus suitable for large-scale production.

This object is accomplished in accordance with the invention, in a fuel cell unit with the features of the preamble to claim 1, in that the fuel cell unit comprises a fluid guiding element which is connected to the contact plate in a fluid-tight manner, forms a boundary of a fluid chamber having fluid flowing through it during operation of the fuel cell unit and is designed as a shaped sheet metal part.

Such a shaped sheet metal part may be produced from an essentially flat sheet metal blank by means of one or more shaping processes, in particular, by means of embossing and/or deep drawing. These production methods are considerably more suitable and more inexpensive for a large-scale production than the production of solid metal plates by way of milling or erosion.

In addition, it is possible to save on material and weight due to the use of shaped sheet metal parts.

The fluid flowing through the fluid chamber can be a combustible gas, an oxidation agent or a refrigerant.

In particular, it may be provided for the fluid chamber to be surrounded, apart from by the fluid guiding element, by the contact plate and by the cathode-anode-electrolyte unit.

In a preferred configuration of the invention it is provided for the cathode-anode-electrolyte unit of the fuel cell unit to be arranged on the fluid guiding element.

In particular, it may be provided for the cathode-anode-electrolyte unit to be arranged between the fluid guiding element, on the one hand, and the contact plate of the same fuel cell unit or an adjacent fuel cell unit, on the other hand.

The inventive fuel cell unit is already particularly simple to handle prior to the assembly of the composite block of fuel cells when the cathode-anode-electrolyte unit is held between the fluid guiding element and the contact plate of the same fuel cell unit.

Alternatively hereto, it may also be provided for the cathode-anode-electrolyte unit to be designed as a coating on the fluid guiding element or on the contact plate of the fuel cell unit.

It is particularly favorable when not only the fluid guiding element but also the contact plate is designed as a shaped sheet metal part. In this case, the contact plate of the fuel cell unit may also be produced in a simple manner by way of embossing and/or deep drawing from an essentially flat sheet metal blank which is more suitable and more inexpensive for a large-scale production than the production of solid contact plates by way of milling or erosion.

The contact plate and the fluid guiding element may, in this case, form a two-part shell of the fuel cell unit which surrounds the cathode-anode-electrolyte unit.

The inventive construction of a fuel cell unit is particularly suitable for so-called high-temperature fuel cell units which have an operating temperature of up to 950° C. and can be operated, without any external reformer, directly with a hydrocarbonaceous combustible gas, such as, for example, methane or natural gas or alternatively hereto, using an external reformer, with a diesel or petroleum motor fuel.

For use in such a high-temperature fuel cell unit the shaped sheet metal parts, from which the fluid guiding element and also, where applicable, the contact plate of the fuel cell unit are formed, are produced from a sheet metal material which is chemically resistant at the resulting temperatures of up to 950° C. in relation to the components of the combustible gas, the combustion air supplied and a refrigerant supplied where applicable (for example cooling air).

High-grade steel sheets resistant to high temperatures or steel sheets coated with an inorganic or ceramic material are particularly suitable for this purpose.

Furthermore, a sheet metal material is preferably selected which has a thermal coefficient of expansion compatible with that of the CAE unit.

The thickness of the sheet metal material used is preferably at the most approximately 3 mm, in particular, at the most approximately 1 mm.

In order to achieve a reliable connection between the contact plate and the fluid guiding element of the same fuel cell unit which is also resistant and gas-tight at high temperatures, it is preferably provided for the fluid guiding element and the contact plate to be connected to one another by way of welding, preferably by laser welding or by electron beam welding.

Alternatively or in addition hereto it may be provided for the fluid guiding element and the contact plate to be connected to one another by way of soldering, preferably by hard soldering.

In order to make the required compensation of charges between the CAE units of fuel cell units adjacent to one another possible in a simple manner it is provided in a preferred configuration of the inventive fuel cell unit for the fluid guiding element to have an opening for the passage of contact elements (e.g. of an adjacent fuel cell unit) to the cathode-anode-electrolyte unit.

In order to be able to hold the CAE unit between the fluid guiding element and the contact element of the fuel cell unit without shorting the anode and the cathode of the same fuel cell unit with one another, it is advantageously provided for the fluid guiding element to abut on the cathode-anode-electrolyte unit via an electrically insulating seal.

In a preferred configuration of the invention, the fluid guiding element is designed as a fluid guiding frame which abuts on the cathode-anode-electrolyte unit along the entire edge thereof via the electrically insulating seal.

It is particularly favorable when the seal between the fluid guiding element and the CAE unit comprises mica.

Alternatively or in addition hereto, it may be provided for the seal between the CAE unit and the fluid guiding element to comprise a flat seal.

Alternatively or in addition hereto, it may be provided for the seal between the CAE unit and the fluid guiding element to comprise a coating on the fluid guiding element and/or on the cathode-anode-electrolyte unit.

Such a coating may be applied, for example, by the screen printing method, by roller coating or by spray coating onto the fluid guiding element or the cathode-anode-electrolyte unit.

Inorganic or ceramic sealing media, which are chemically resistant, gas-tight and electrically insulating at an operating temperature of up to 950° C., can be considered, in particular, for the sealing.

A solder glass can, for example, be used as sealing medium and this can be composed, for example, like a solder glass known from EP 0 907 215 A1, i.e. can contain 11 to 13% by weight of aluminum oxide ($Al_2O_3$), 10 to 14% by weight of boron oxide ($BO_2$), approximately 5% by weight of calcium oxide (CaO), 23 to 26% by weight of barium oxide (BaO) and approximately 50% by weight of silicon oxide ($SiO_2$).

Furthermore, it may be provided for the seal between the CAE unit and the fluid guiding element to be designed as a movable seal (slide fit sealing).

Furthermore, it may be provided for the fluid guiding element to be connected to the CAE unit by way of flanging.

It may, in particular, be provided for a flange fold area engaging around the CAE unit to be formed on the fluid guiding element.

In order to obtain the required pressing force for the sealing between the CAE unit and the fluid guiding element irrespective of any external biasing of the fuel cell units against one another, it is preferably provided for the cathode-anode-electrolyte unit and the fluid guiding element to already be biased elastically against one another on account of the geometry of the fuel cell unit and the connection between the fluid guiding element and the contact plate of the fuel cell unit.

In order to be able to use the fluid guiding element, apart from for holding the CAE unit, also for the formation of fluid channels, through which a fluid is supplied to the fuel cell unit or discharged from the same, it is provided in a preferred configuration of the invention for the fluid guiding element to be provided with at least one fluid port.

The area of the fluid guiding element surrounding the fluid port serves in this case as fluid guiding area of the fluid guiding element. A fluid channel then results from the fluid guiding areas of the fluid guiding elements of fuel cell units following one another in the stacking direction.

The fluid supplied or discharged via the fluid channel can be an oxidation agent or, preferably, a combustible gas.

It is particularly favorable when the holding means is provided with a fluid supply channel opening and with a fluid discharge channel opening. In this case, the fluid guiding element can be used not only for the formation of a fluid supply channel but also for the formation of a fluid discharge channel.

In order, during the formation of such fluid channels, to maintain the required electric insulation between the contact plates and fluid guiding elements of adjacent fuel cell units, it is advantageously provided for the fuel cell unit to comprise an electrically insulating fluid channel seal, via which the contact plate of the fuel cell unit abuts on the fluid guiding element of an adjacent fuel cell unit.

Alternatively or in addition hereto it may also be provided for the fuel cell unit to comprise a fluid channel seal, via which the fluid guiding element of the fuel cell unit abuts on the contact plate of an adjacent fuel cell unit.

Such a fluid channel seal may, for example, comprise a coating on the fluid guiding element and/or on the contact plate.

Such a coating may be applied, in particular, by the screen printing method, by roller coating or spray coating onto the fluid guiding element or the contact plate, respectively.

Inorganic and ceramic materials, which are chemically resistant, gas-tight and electrically insulating at the resulting operating temperatures of up to 950° C., can be considered, in particular, as sealing media.

A particularly simple construction of the fluid channel seal results when this comprises a flat seal.

Particularly when the holding plate and the contact plate are connected to one another by flanging, it is of advantage when the fluid channel seal comprises at least two separate sealing elements which can be arranged, in particular, in different planes.

In order to compensate for different heat expansions, it is particularly favorable when the fluid channel seal comprises a slide fit sealing.

Particularly with a design as slide fit sealing it is of advantage when the fluid channel seal comprises a material, preferably a solder glass, viscous at the operating temperature of the fuel cell unit.

Claim 20 is directed to a composite block of fuel cells which comprises a plurality of inventive fuel cell units which follow one another along a stacking direction.

In order to be able to fix the individual fuel cell units of the composite block of fuel cells in their position relative to one another and, where required, to be able to generate an adequate contact pressure for the sealing between the CAE unit and the fluid guiding element and/or for the sealing between the fluid guiding element and the contact plate of an adjacent fuel cell unit, it is favorable when the composite block of fuel cells comprises at least one clamping element for bracing the fuel cell units against one another.

The composite block of fuel cells can, in particular, comprise two end plates which can be braced against one another by means of the clamping element.

In order to be able to supply a fluid (combustible gas, oxidation agent or refrigerant) to the composite block of fuel cells in a simple manner or discharge the fluid out of the composite block of fuel cells it is advantageously provided for at least one of the end plates to have at least one fluid port.

Bracing of the fuel cell units of the composite block of fuel cells against one another by means of a separate clamping element is superfluous when it is advantageously provided for the fluid guiding element of at least one of the fuel cell units to be connected to the contact plate of an adjacent fuel cell unit by way of flanging. This flanging is sufficient to secure the fuel cell units in their position relative to one another.

Nevertheless, an additional clamping element can be used in such a case to generate the contact pressure between the CAE units and the contact plates of the composite block of fuel cells.

It may, in particular, be provided for a flange fold area engaging around the contact plate of the adjacent fuel cell unit to be formed on the fluid guiding element of at least one of the fuel cell units.

Alternatively hereto, it may also be provided for a flange fold area engaging around the fluid guiding element of the adjacent fuel cell unit to be formed on the contact plate of at least one of the fuel cell units.

In a preferred configuration of the composite block of fuel cells it is provided for an electrically insulating fluid channel seal to be arranged between the flange fold area and the contact plate of the adjacent fuel cell unit. As a result of the flanging, such a fluid channel seal is already subject to the contact pressure required for an adequate sealing without any force of an external clamping system being required for this purpose.

In order to produce a composite block of fuel cells which comprises a plurality of inventive fuel cell units, a method is suitable which comprises the following method steps:
   Assembly of the individual fuel cell units by arranging a cathode-anode-electrolyte unit between a contact plate and a fluid guiding element and gas-tight connection of the contact plate to the fluid guiding element;
   subsequent assembly of the composite block of fuel cells by arranging a plurality of fuel cell units along a stacking direction and fixing the fuel cell units in their position relative to one another.

With such a method, the individual parts contact plate, CAE unit and fluid guiding element of a respective fuel cell unit are first of all fitted together and the contact plate and the fluid guiding element are connected to one another, for example, by welding or soldering in order to assemble the individual fuel cell unit.

Subsequently, the assembly of the entire composite block of fuel cells takes place, with which the fuel cell units of the composite block of fuel cells are preferably braced against one another by means of at least one clamping element.

In a special configuration of the method it may be provided for the fuel cell units of the composite block of fuel cells to be arranged between two end plates and for the two end plates to be braced against one another.

The method described above is suitable for the production of the composite block of fuel cells, in particular, when the fluid guiding element of at least one fuel cell unit abuts on the contact plate of an adjacent fuel cell unit via a flat seal or a slide fit sealing.

If, on the other hand, in the composite block of fuel cells to be produced the fluid guiding element of one fuel cell unit is connected to the contact plate of an adjacent fuel cell unit by way of flanging, a method which comprises the following method steps is particularly suitable for the production of such a composite block of fuel cells:
   Assembly of several fluid guiding element-contact plate units by connecting a respective fluid guiding element of one fuel cell unit to a contact plate of an adjacent fuel cell unit by way of flanging;
   formation of a stack consisting of fluid guiding element-contact plate units following one another along a stacking direction, wherein one respective cathode-anode-electrolyte unit is arranged between two such respective units;
   gas-tight connection of the contact plates of the fuel cell units to the respective fluid guiding element of the same fuel cell unit.

With this method for the production of the composite block of fuel cells, the fluid guiding element of a first fuel cell unit is first of all preassembled with the contact plate of a second fuel cell unit by way of flanging, preferably at the combustible gas channel and at the discharge gas channel, wherein electrically insulating fluid channel seals are integrated into the respective flangings. Subsequently, the final assembly of the composite block of fuel cells is carried out in that the CAE units are arranged each time between the consecutive fluid guiding element-contact plate units and the contact plates and fluid guiding elements belonging to the same fuel cell unit, which hold a respective CAE unit between them, are connected to one another in a gas-tight manner by way of welding or soldering.

Additional features and advantages of the invention are the subject matter of the following description and drawings illustrating embodiments. In the drawings.

Figure 1:
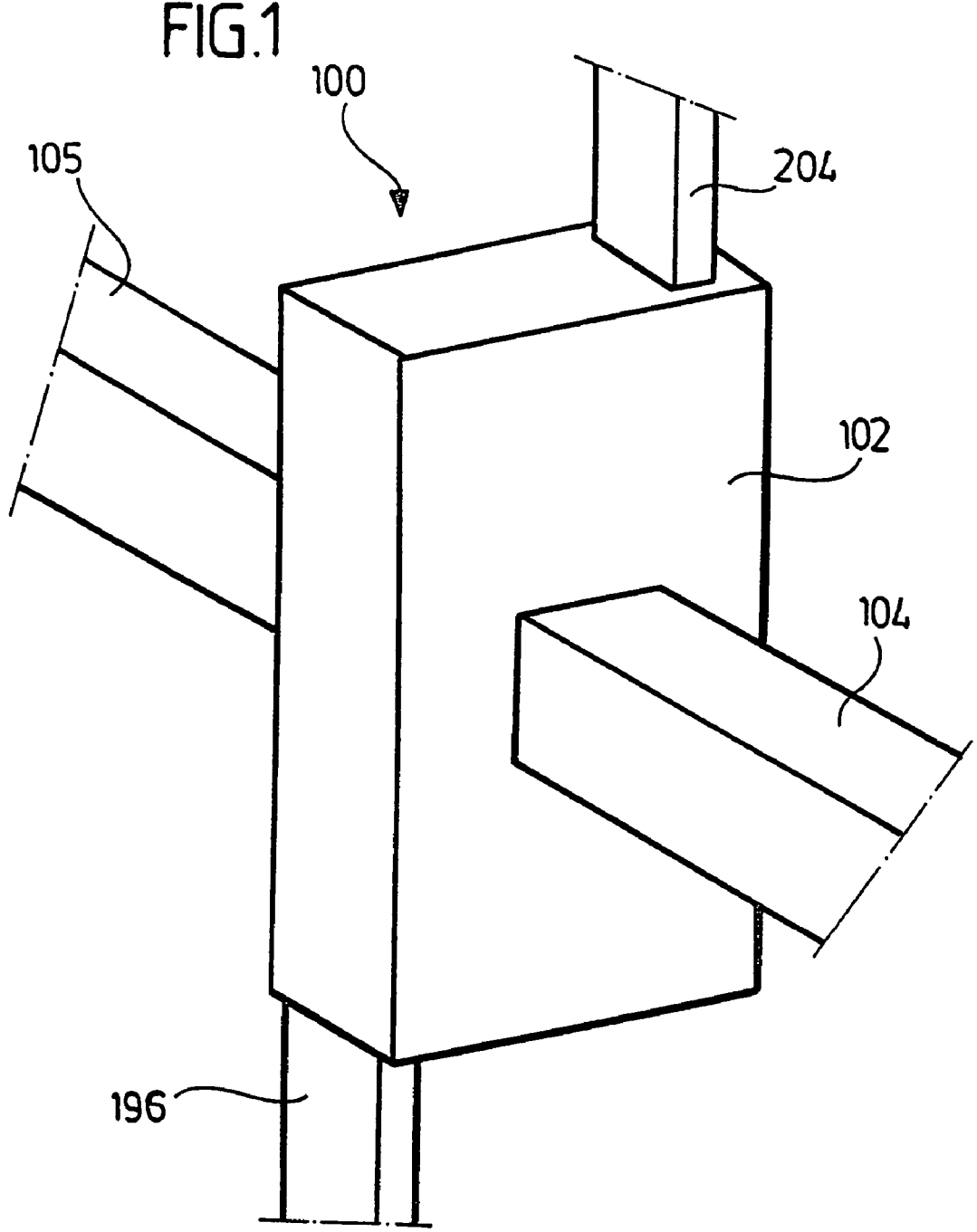
FIG. 1 shows a schematic perspective illustration of a fuel cell device with supply lines and discharge lines for the oxidation agent and the combustible gas.
Figure 2:
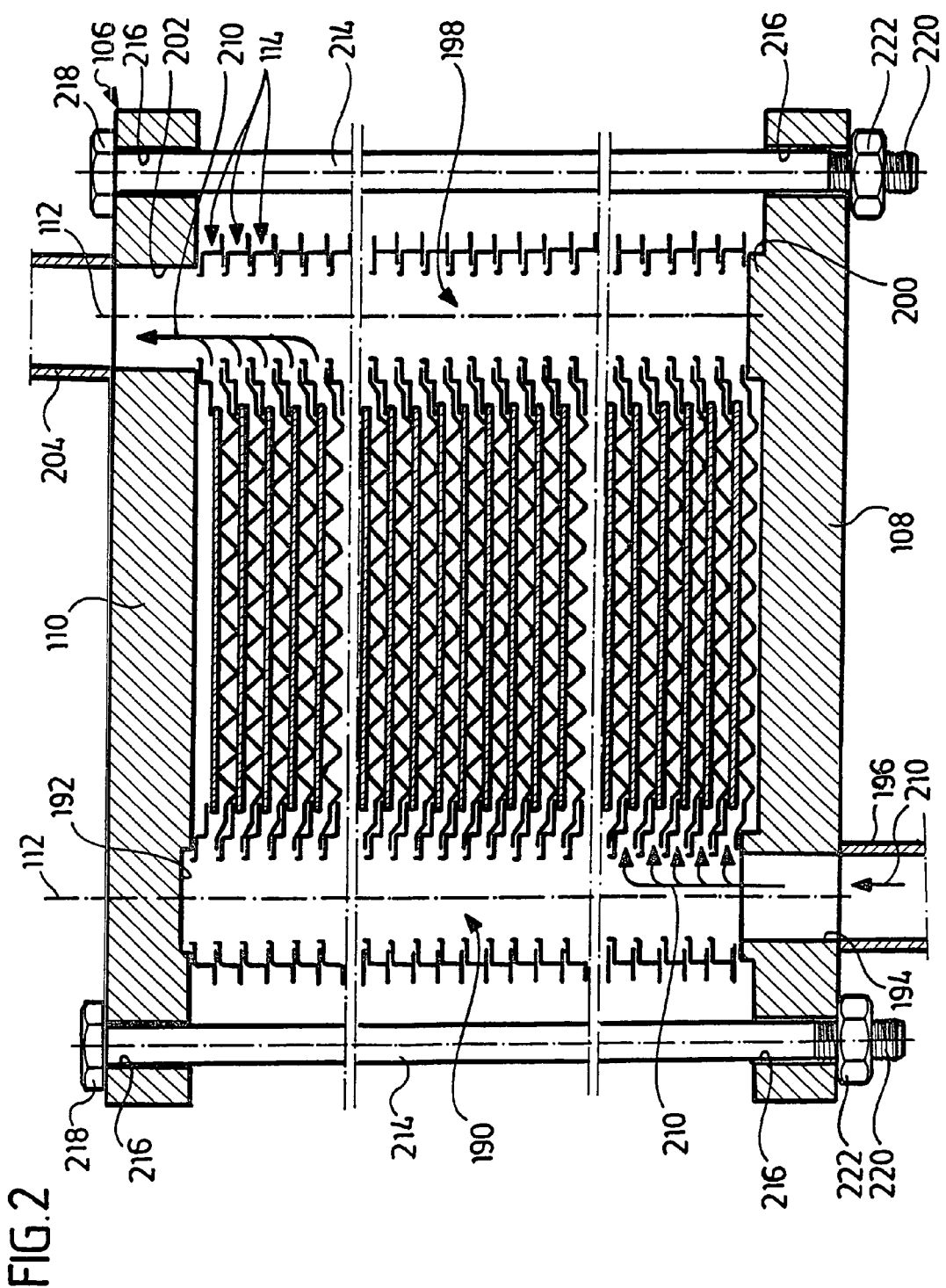
FIG. 2 shows a schematic longitudinal section through a composite block of fuel cells arranged in the housing of the fuel cell device from FIG. 1.
Figure 8:
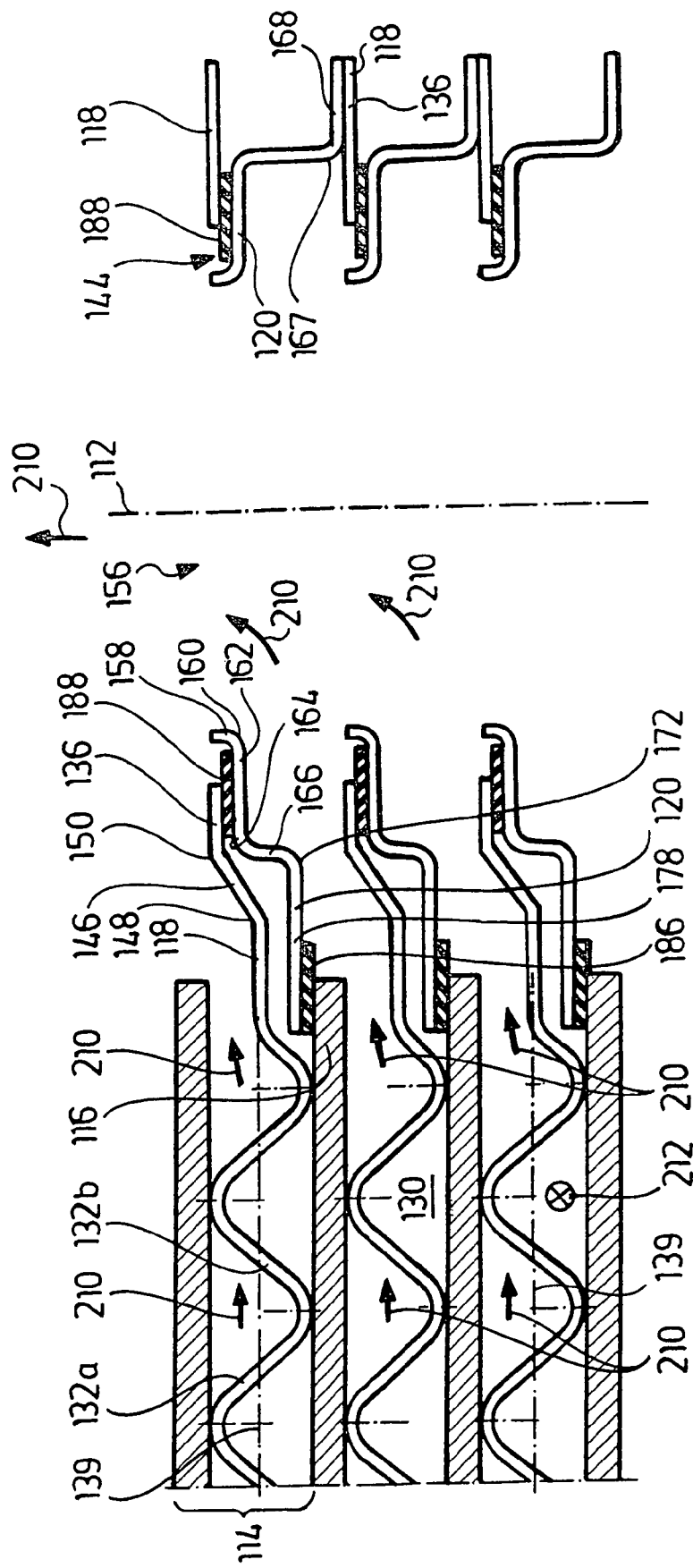
Figure 9:
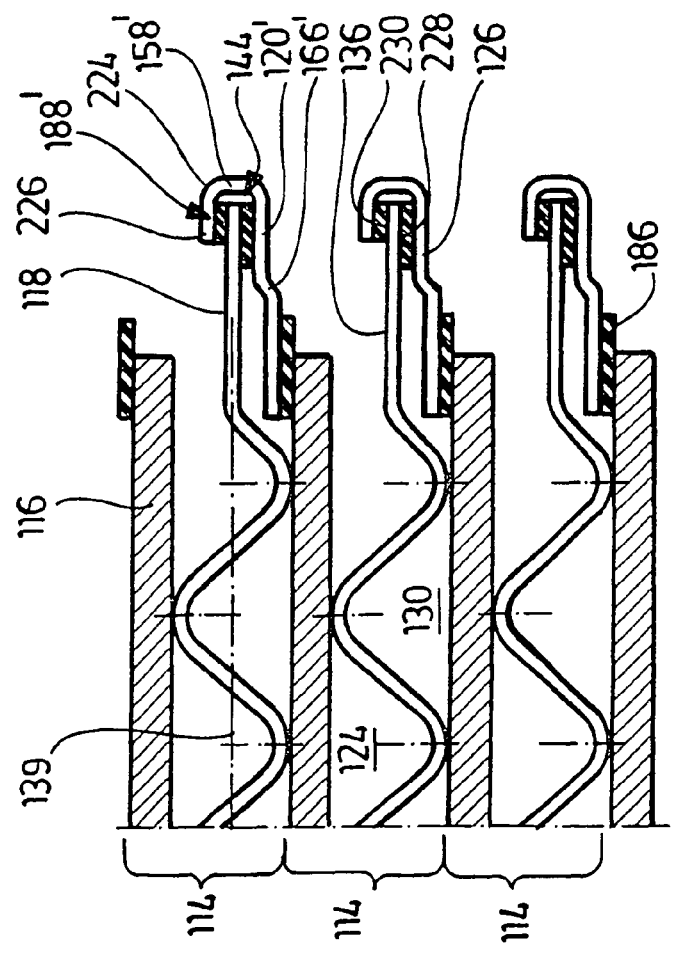
Figure 10:
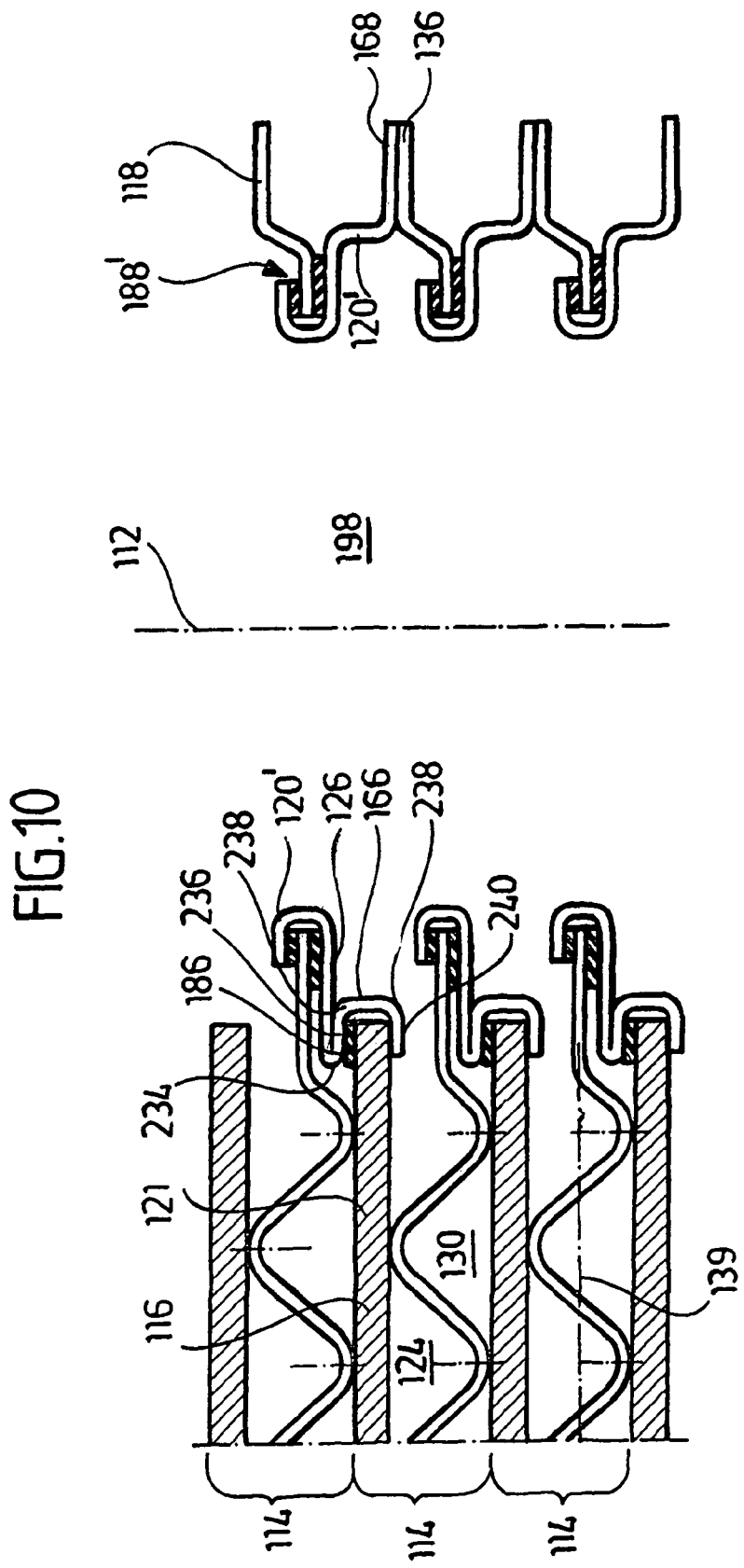
Figure 11:
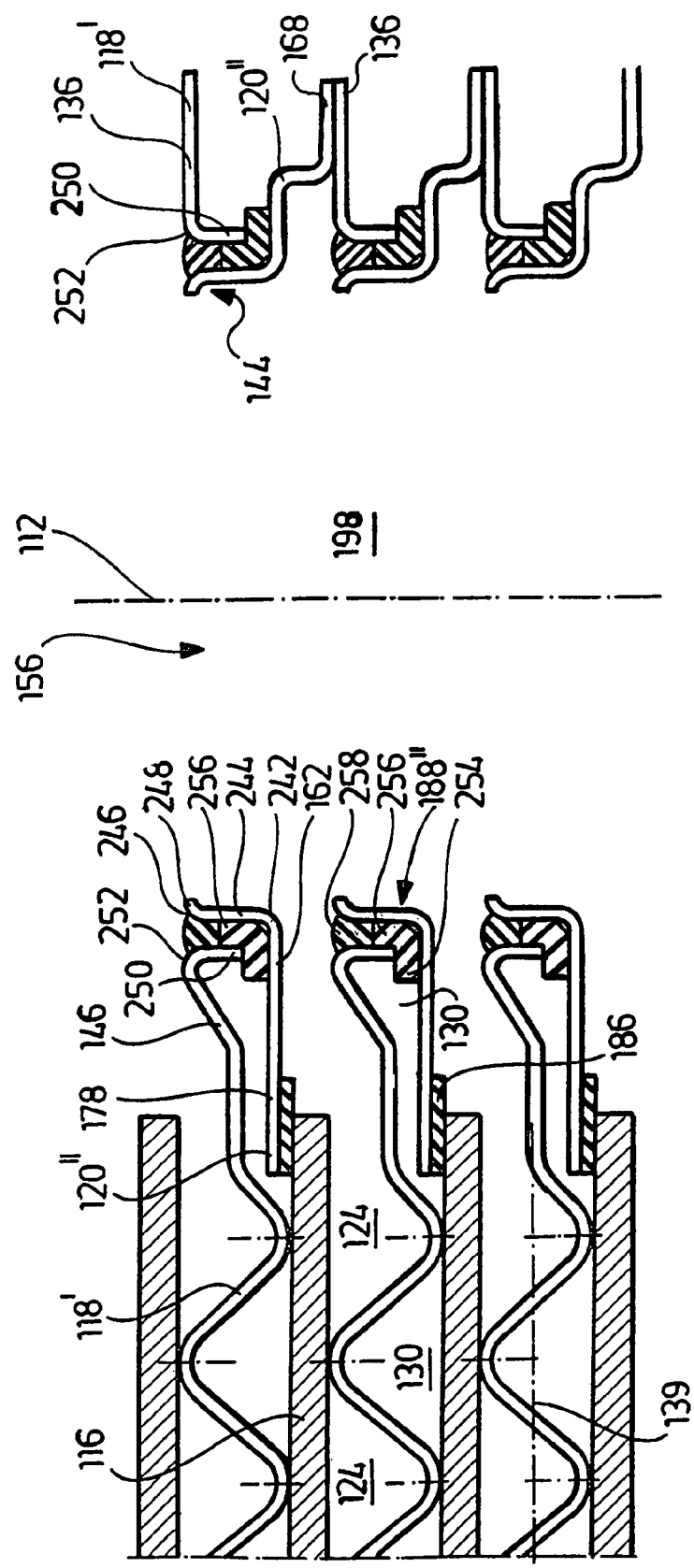

FIG. 8 shows the right-hand part of a schematic longitudinal section through three fuel cell units of the composite block of fuel cells from FIG. 2 following one another along the stacking direction in a first embodiment of the composite block of fuel cells, with which a fluid guiding frame of a fuel cell unit abuts via a flat seal on a cathode-anode-electrolyte unit (CAE unit) of the same fuel cell unit and via an additional flat seal on the contact plate of an adjacent fuel cell unit;

FIG. 9 shows a schematic longitudinal section corresponding to FIG. 8 through three fuel cell units following one another along the stacking direction in a second embodiment of the composite block of fuel cells, with which the fluid guiding frame of one fuel cell unit is connected to the contact plate of an adjacent fuel cell unit by way of flanging;

FIG. 10 shows a schematic longitudinal section corresponding to FIG. 8 through three fuel cell units following one another along the stacking direction in a third embodiment of the composite block of fuel cells, with which the fluid guiding frame of one fuel cell unit is connected to the CAE unit of the same fuel cell unit by way of flanging and to the contact plate of an adjacent fuel cell unit likewise by flanging;

FIG. 11 shows a schematic longitudinal section corresponding to FIG. 8 through three fuel cell units following one another along the stacking direction in a fourth embodiment of the composite block of fuel cells, with which the fluid guiding frame of one fuel cell unit is connected to the contact plate of an adjacent fuel cell unit via a slide fit sealing; and FIG. 12 shows a schematic longitudinal section corresponding to FIG. 8 through three fuel cell units following one another along the stacking direction in a fifth embodiment of the composite block of fuel cells, with which the fluid guiding frame of one fuel cell unit is connected to the CAE unit of the same fuel cell unit and to the contact plate of an adjacent fuel cell unit via a respective slide fit sealing.

The same or functionally equivalent elements are designated in all the Figures with the same reference numerals.

A fuel cell device illustrated in FIGS. 1 to 8 and designated as a whole as 100 comprises an essentially parallelepiped housing 102 (cf. FIG. 1), into which a supply line 104 for oxidation agent opens, via which an oxidation agent, for example, air or pure oxygen is supplied to the interior of the housing 102 by a supply blower (not illustrated) at an overpressure of, for example, approximately 50 millibars.

Furthermore, a discharge line 105 for oxidation agent, through which superfluous oxidation agent can be discharged from the interior of the housing 102, opens into the housing 102.

A composite block of fuel cells 106 illustrated as a whole in FIG. 2 is arranged in the interior of the housing 102 and comprises a lower end plate 108, an upper end plate 110 and a plurality of fuel cell units 114 which are arranged between the lower end plate 108 and the upper end plate 100 and follow one another along a stacking direction 112.

As is best apparent from FIG. 4, which shows a perspective, exploded illustration of two fuel cell units 114 following one another along the stacking direction 112, each of the fuel cell units 114 comprises an essentially plate-like cathode-anode-electrolyte unit 116 (abbreviated in the following to: CAE unit) which is held between a contact plate 118 and a fluid guiding frame 120.

Figure 3:
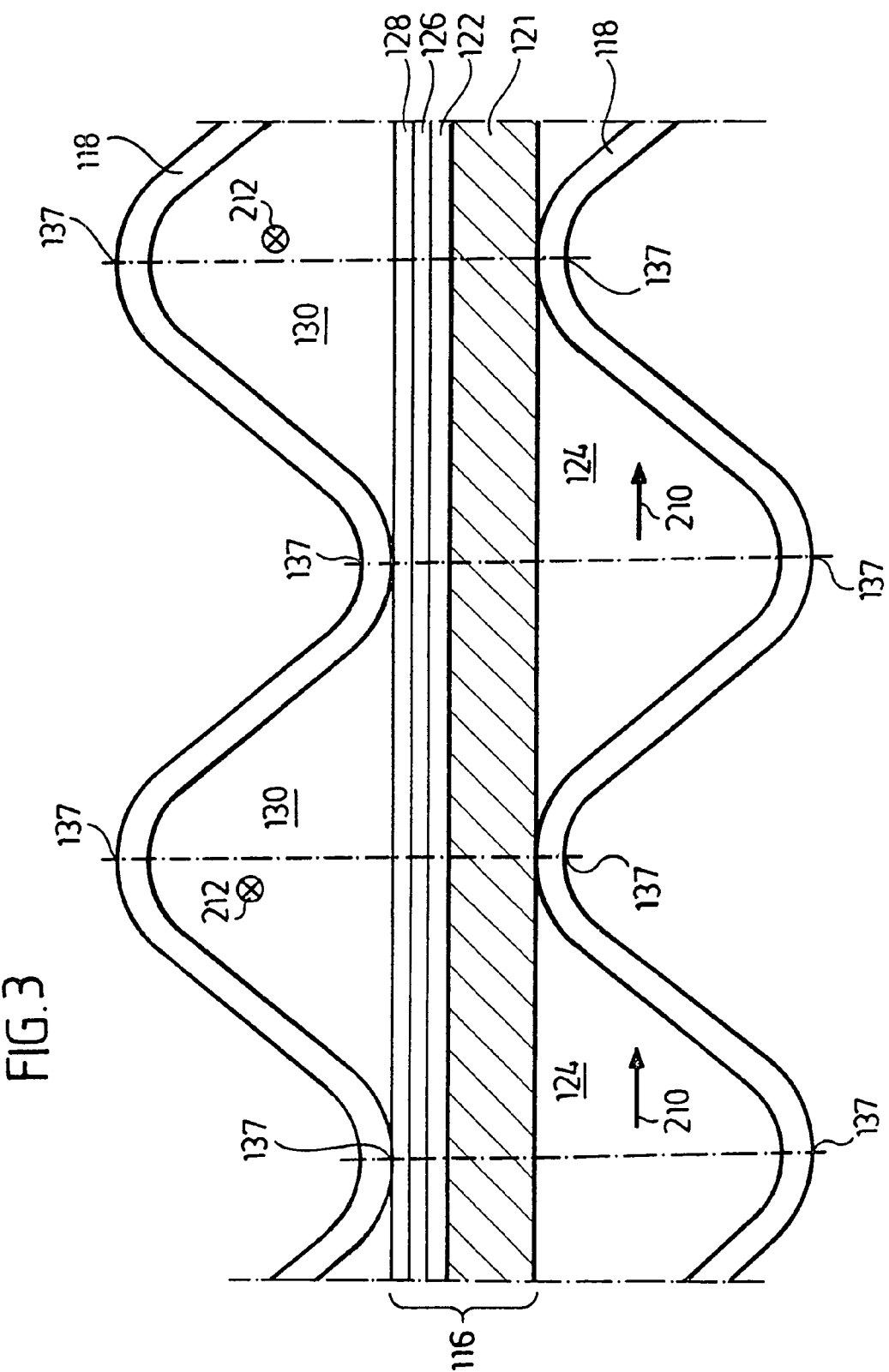
FIG. 3 shows a schematic longitudinal section through a cathode-anode-electrolyte unit with contact plates adjoining thereto.

The CAE unit 116 comprises, as illustrated purely schematically in FIG. 3, a gas-permeable, electrically conductive support layer 121 which can be designed, for example, as a mesh or net consisting of a metallic material, e.g. of nickel, through the openings in which a combustible gas can pass from a chamber 124 for combustible gas adjoining the support layer 121.

Furthermore, the CAE unit 116 comprises a plate-like anode 122 which is arranged on the support layer 121 and consists of an electrically conductive, ceramic material, such as, for example, Ni—$ZrO_2$ ceramet (ceramic-metal mixture), which is porous in order to enable the combustible gas from the chamber 124 for combustible gas to pass through the anode 122 to the electrolyte 126 adjoining the anode 122.

A hydrocarbonaceous gas mixture or pure hydrogen can be used, for example, as combustible gas.

The electrolyte 126 is preferably designed as a solid electrolyte and formed, for example, from a yttrium-stabilized circonium dioxide.

On the side of the electrolyte 126 located opposite the anode 122 a plate-like cathode 128 borders thereon, which is formed from an electrically conductive, ceramic material, for example, from $LaMnO_3$ and has a porosity in order to enable an oxidation agent, for example, air or pure oxygen to pass to the electrolyte 126 from a chamber 130 for oxidation agent adjoining the cathode 128.

During operation of the fuel cell device 100 the CAE unit 116 of each fuel cell unit 114 has a temperature of, for example, approximately 850° C., at which the electrolyte 126 is conductive for oxygen ions. The oxidation agent from the chamber 130 for oxidation agent absorbs electrons at the anode 122 and releases bivalent oxygen ions to the electrolyte 126 which migrate through the electrolyte 126 to the anode 122. At the anode 122, the combustible gas from the chamber 124 for combustible gas is oxidized by the oxygen ions from the electrolyte 126 and thereby releases electrons to the anode 122.

The contact plates 118 serve to draw off from the anode 122 via the support layer 121 the electrons released during the reaction at the anode 122 or rather feed to the cathode 128 the electrons required for the reaction at the cathode 128.

For this purpose, each of the contact plates 118 consists of a metal sheet which is a good electrical conductor and is provided (as best seen from FIG. 5) with a plurality of contact elements 132 which have, for example, the shape of projections and recesses which adjoin one another, have a respectively square design and are formed by the superposition of a first wave pattern with wave troughs and crests directed parallel to the narrow sides 133 of the contact plate 118 and a second wave pattern with wave troughs and crests directed parallel to the longitudinal sides 135 of the contact plate 118.

The contact field 134 of the contact plate 118 formed from the contact elements 132 thus has the structure of corrugated metal corrugated in two directions at right angles to one another.

The contact elements 132 are arranged on the respective contact plate 118 in a square grating, wherein contact elements adjacent to one another project alternatingly to different sides of the contact plate 118 from the central plane 139 of the contact plate 118. The contact elements on the anode side projecting from the contact plate 118 upwards and thus to the anode 122 of the CAE unit 116 belonging to the same fuel cell unit 114 are designated with the reference numeral 132a, the contact elements on the cathode side projecting from the contact plate 118 downwards and thus to the cathode 128 of the CAE unit 116 belonging to an adjacent fuel cell unit 114 are designated with the reference numeral 132b.

Figure 5:
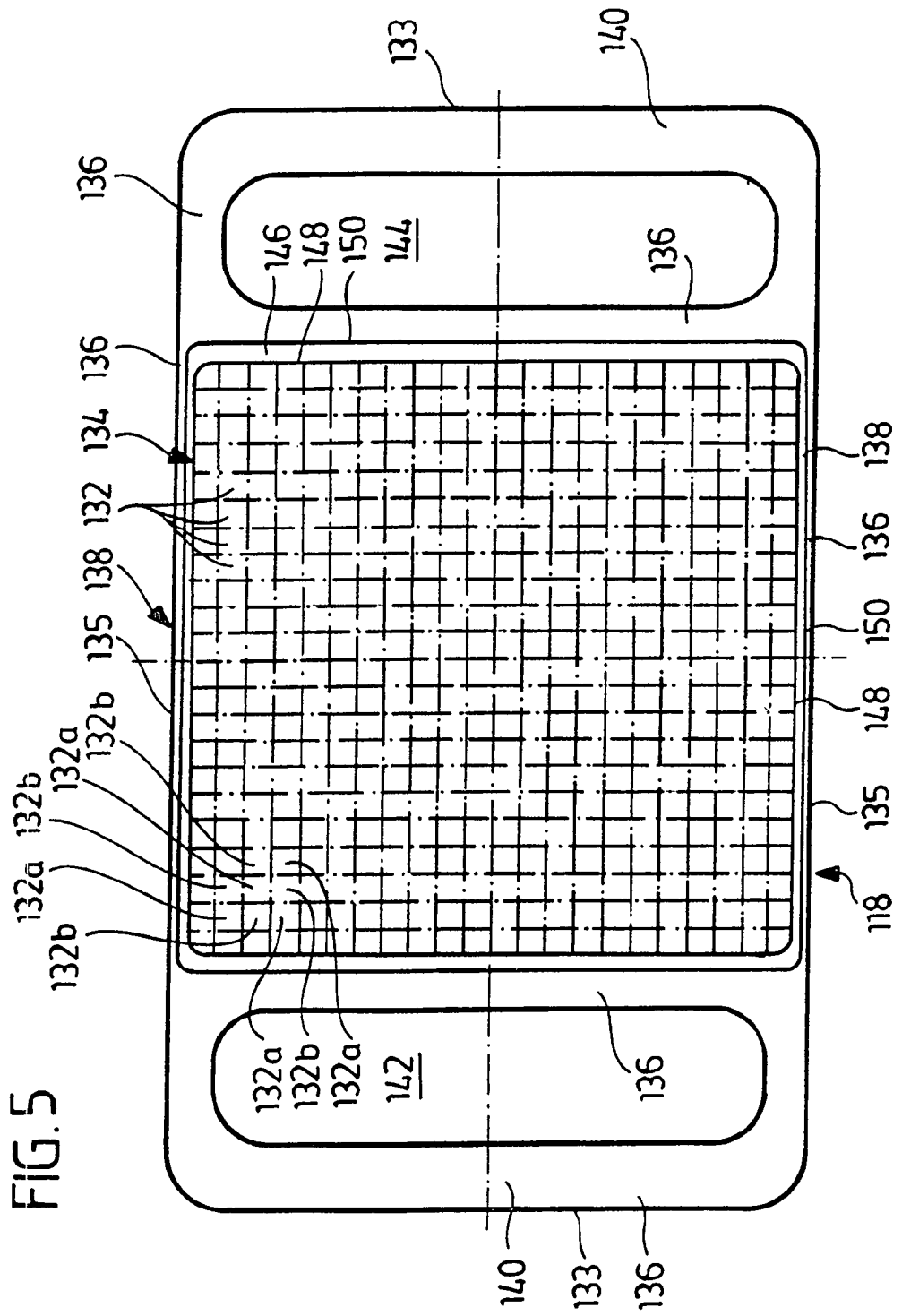
FIG. 5 shows a schematic plan view of a contact plate of one of the fuel cell units from FIG. 4.

The dash-dot lines drawn in FIG. 5 within the contact field 134 reproduce the boundary lines of the contact elements 132, along which the contact plate 118 intersects their central plane 139.

Each of the contact elements 132 has a central contact area 137, at which it is in electrically conductive contact with an adjoining CAE unit 116.

The contact areas 137 of the anode-side contact elements 132a of a contact plate 118 are in electrical point contact with the support layer 121 and thus with the anode 122 of the CAE unit 116 belonging to the same fuel cell unit 114 so that electrons can pass from the respective anode 122 to the contact plate 118.

The cathode-side contact elements 132b of the contact plates 118 are in electrically conductive point contact with the cathode 128 of the CAE unit 116 belonging to an adjacent fuel cell unit 114 so that electrons can pass from the contact plate 118 to the cathode 128. In this way the contact plates 118 make a charge compensation possible between the anodes 122 and cathodes 128 along the stacking direction 112 of consecutive CAE units 116.

The contact plates 118 arranged at the ends of the composite block of fuel cells 106 are (in a manner not illustrated in the drawings) connected to an external current circuit in order to tap the electrical changes resulting at these edge-side contact plates 118.

Figure 7:
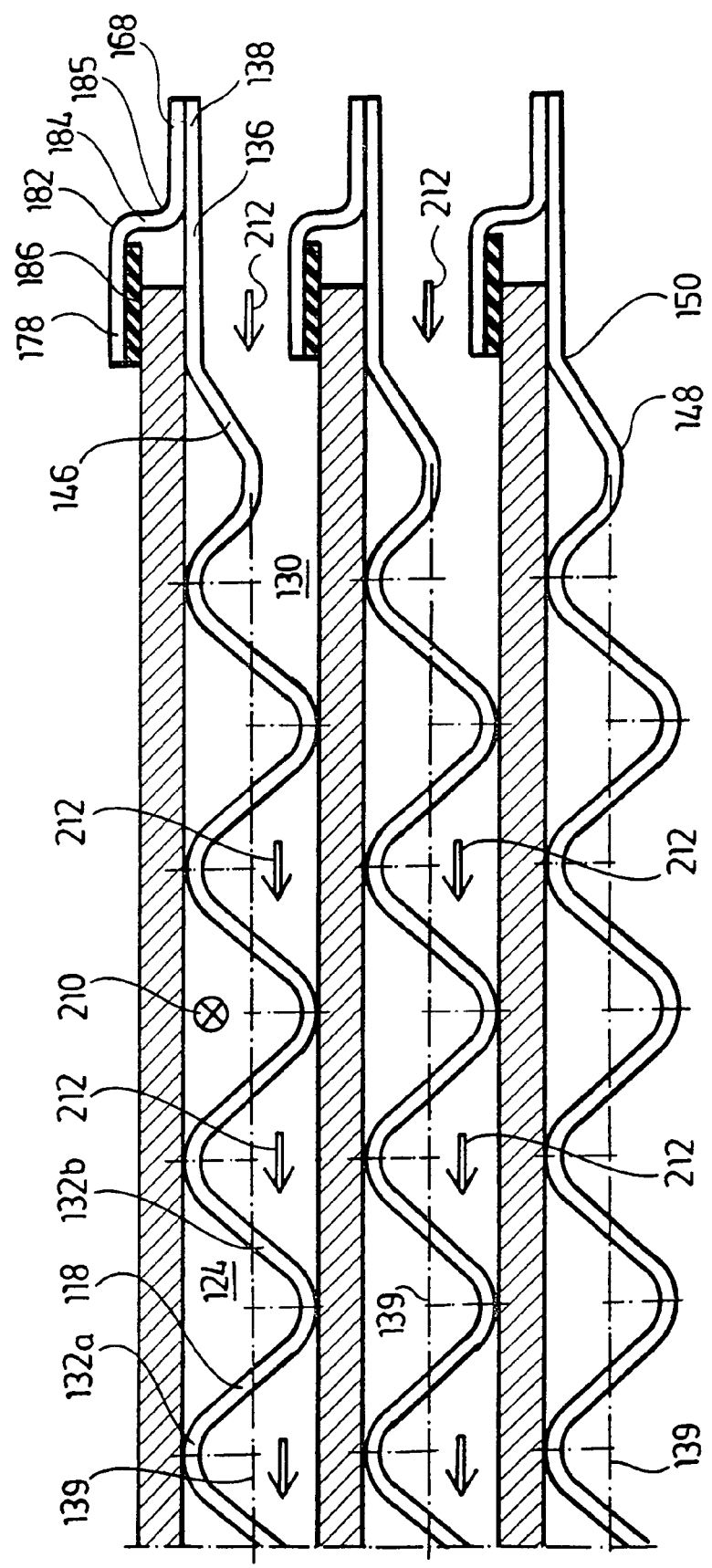
FIG. 7 shows the right-hand part of a schematic cross section through three fuel cell units of the composite block of fuel cells from FIG. 2 following one another in the stacking direction.

As is best apparent from the plan view of FIG. 5, the central, rectangular contact field 134 of each contact plate 118 provided with the contact elements 132 is surrounded by a flat flange area 136 which forms the outer edge of the contact plate 118 and is aligned parallel to the central plane 139 of the contact field 134 but in relation to this is displaced towards the CAE unit 116 so that in the area of the narrow longitudinal sides 138 of the flange area 136 the underside of the CAE unit 116 rests on the upper side of the flange area 136 (cf., in particular, FIG. 7).

The broad side areas 140 of the flange area 136 each have a port 142 and 144, respectively, which enable the passage of combustible gas to be supplied to the fuel cell units 114 or of waste gas to be discharged from the fuel cell units 114, this waste gas containing superfluous combustible gas and products of combustion, in particular, water.

The flange area 136 is connected to the contact field 134 arranged so as to be offset hereto via an inclined surface 146 which surrounds the contact field 134 and adjoins the contact field 134 at a first bending line 148 and the flange area 136 at a second bending line 150.

Each of the contact plates 118 is designed as a shaped sheet metal part which is formed from an essentially flat, essentially rectangular layer of sheet metal by way of embossing and/or deep drawing as well as by punching or cutting out the ports 142, 144.

The fluid guiding frames 120 are also formed as shaped sheet metal parts from an essentially flat, essentially rectangular sheet metal layer.

Figure 6:
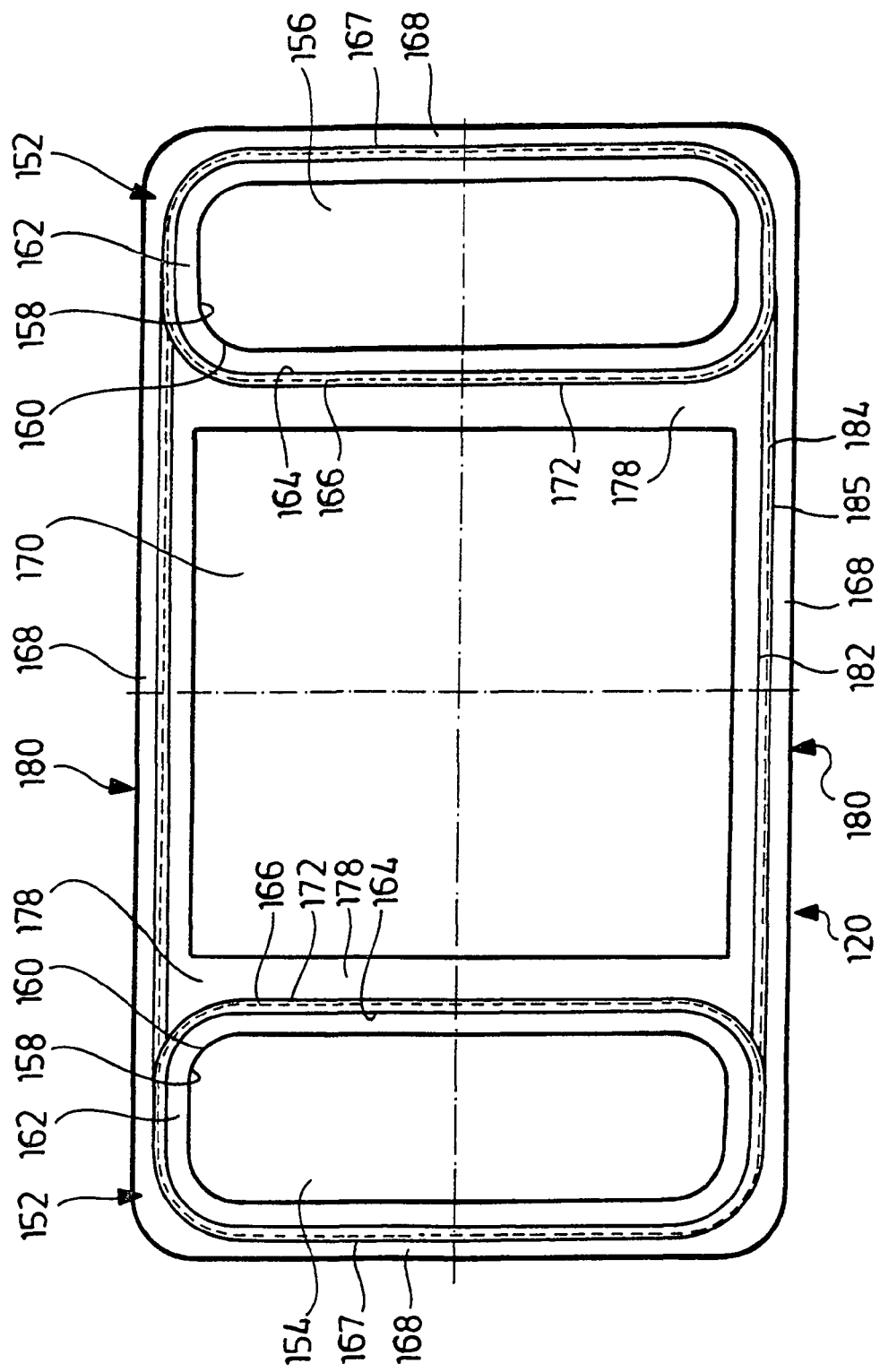
FIG. 6 shows a schematic plan view of a fluid guiding frame of one of the fuel cell units from FIG. 4.

As is best seen in FIG. 6, each fluid guiding frame 120 has at its end areas 152 ports corresponding to the ports 142, 144 in the contact plates 118, namely a combustible gas port 154 and a waste gas port 156.

As is best seen from FIGS. 6 and 8, each of the ports 154, 156 in a fluid guiding frame 120 is surrounded by a collar 158 extending along the stacking direction 112, a seal contact area 162 adjoining the collar 158 along a bending line 160 and extending away from the port at right angles to the stacking direction 112 and a channel wall area 166 adjoining the seal contact area 162 at a bending line 164 and being aligned parallel to the stacking direction 112. Where the channel wall area 166 adjoins an outer edge of the frame 120 it merges at a bending line 167 into a flange area 168 aligned at right angles to the stacking direction 112.

As is best seen from FIG. 6, each of the fluid guiding frames 120 has between the ports 154, 156 in the end areas 152 of the fluid guiding frame 120 an essentially rectangular, central opening 170 for the passage of the contact elements 132 of the contact plate 118 of an adjacent fuel cell unit 114.

As is apparent from FIGS. 6 and 8, the channel wall area 166, where it is adjacent to the opening 170, merges at a bending line 172 into an inner edge area 178 of the fluid guiding frame 120 aligned at right angles to the stacking direction 112.

As is best seen from FIG. 6, the inner edge area 178 of the fluid guiding frame 120 extends all around the opening 170.

In the narrow longitudinal areas 180 of the fluid guiding frame 120, which are arranged between the openings 170 and the outer edge of the fluid guiding frame 120 and connect the two end areas 152 of the fluid guiding frame 120 with one another, the inner edge area 178 merges at its edge facing away from the opening 170 along a bending line 182 into a vertical wall area 184 which is aligned parallel to the stacking direction 112 and, for its part, merges along a bending line 185 into the flange area 168 forming the outer edge of the fluid guiding frame 120.

Figure 4:
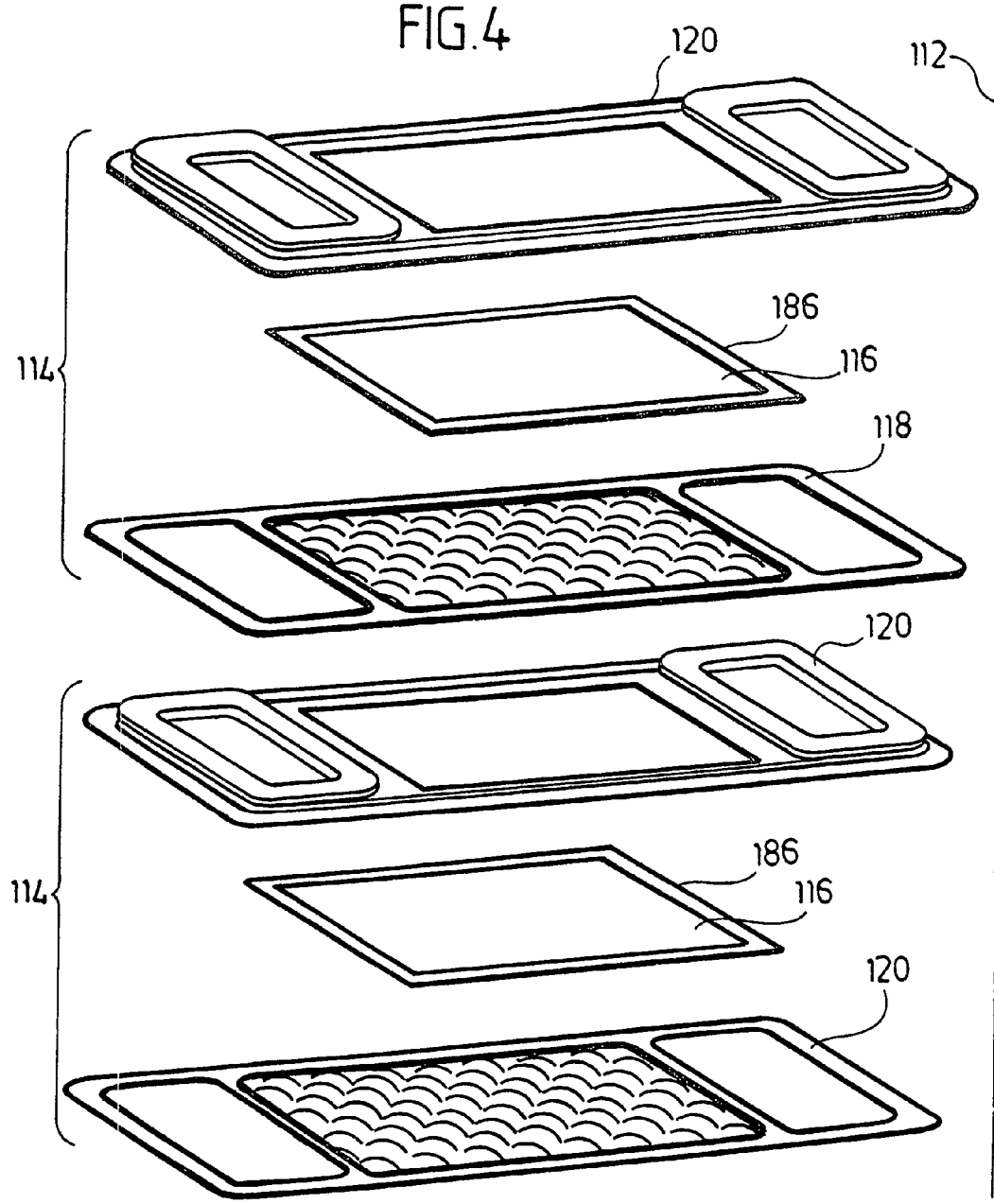
FIG. 4 shows a schematic perspective exploded illustration of two fuel cell units of the composite block of fuel cells from FIG. 2 following one another in a stacking direction.

As is best seen from FIGS. 4 and 8, each CAE unit 116 is provided at the edge of its upper side facing the fluid guiding frame 120 of the same fuel cell unit 114 with a gas-tight, electrically insulating combustible gas chamber seal 186 which projects laterally beyond the CAE unit 116.

The combustible gas chamber seal may comprise, for example, a flat seal consisting of mica.

Alternatively or in addition hereto it may also be provided for the combustible gas chamber seal 186 to comprise a gas-tight, electrically insulating coating on the underside of the fluid guiding frame 120 which is applied to the underside of the inner edge area 178 of the fluid guiding frame 120 by way of the screen printing method or by means of roller coating.

As is best seen from FIG. 8, the two seal contact areas 162 surrounding the ports 154, 156 of the fluid guiding frame 120 are provided with a respective gas channel seal 188 on their upper side facing away from the CAE unit 116.

The gas channel seal 188 also preferably comprises a flat seal consisting of mica or a gas-tight, electrically insulating coating which can be applied to the seal contact area 162 of the fluid guiding frame 120 as a paste by way of the screen printing method or by means of roller coating.

In the assembled state of a fuel cell unit 114, the CAE unit 116 of the relevant fuel cell unit 114 abuts with its support layer 121 on the anode-side contact elements 132a of the contact plate 118 of the fuel cell unit 114.

The fluid guiding frame 120 of the fuel cell unit 114 abuts, for its part, via the combustible gas chamber seal 186 on the outer edge of the cathode 128 of the CAE unit 116 and with the flange area 168 on the flange area 136 of the contact plate 118.

The flange area 168 and the flange area 136 are secured to one another by way of welding (e.g. the laser welding method or the electron beam method) or by soldering, in particular, a hard soldering and sealed in a gas-tight manner.

The fuel cell units 114 of the composite block of fuel cells 106 are stacked on top of one another along the stacking direction 112 such that the cathode-side contact elements 132b of each contact plate 118 extend through the openings 170 in the fluid guiding frame 120 of the respective fuel cell unit 114 arranged therebelow to the cathode of the CAE unit 116 of the fuel cell unit 114 arranged therebelow and abut thereon in electrically conductive contact.

The flange area 136 of each contact plate 118 thereby abuts on the gas channel seal 188 of the fluid guiding frame 120 of the respective fuel cell unit 114 arranged therebelow, wherein the collar 158, which surrounds the respective port 154 or 156 in the fluid guiding frame 120, extends into the respectively corresponding port 142 or 144 of the contact plate 118.

The end area 152 of each fluid guiding frame 120 surrounding the combustible gas port 154 forms a combustible gas guiding area. The end area 152 of each fluid guiding frame 120 surrounding the waste gas port 156 forms a waste gas guiding area.

As is best seen from the sectional illustration of FIG. 2, the combustible gas guiding areas of the fluid guiding frames 120 which follow one another along the stacking direction 112 together form a combustible gas channel 190 which extends parallel to the stacking direction 112 and at its upper end opens in a recess 192 on the underside of the upper end plate 110.

At the lower end of the combustible gas channel 190, a combustible gas supply opening 194 opens into it which passes through the lower end plate 108 of the composite block of fuel cells 106 coaxially to the combustible gas channel 190.

A combustible gas supply line 196 is connected to the end of the combustible gas supply opening 194 facing away from the combustible gas channel 190, this supply line being guided through the housing 102 of the fuel cell device 100 in a gas-tight manner and being connected to a combustible gas supply (not illustrated) which supplies to the combustible gas supply line 196 a combustible gas, for example, a hydrocarbonaceous gas or pure hydrogen at an overpressure of, for example, approximately 50 millibars.

As is likewise best seen from FIG. 2, the waste gas guiding areas of the fluid guiding frames 120 following one another along the stacking direction 112 together form a waste gas channel 198 which is aligned parallel to the stacking direction 112 and at its lower end is closed by a projection 200 provided on the upper side of the lower end plate 108 of the composite block of fuel cells 106.

At its upper end the waste gas channel 198 opens into a waste gas discharge opening 202 which is coaxial thereto, passes through the upper end plate 110 of the composite block of fuel cells 106 and at its end facing away from the waste gas channel 198 is connected to a waste gas discharge line 204.

The waste gas discharge line 204 is guided through the housing 102 of the fuel cell device 100 in a gas-tight manner and connected to a waste gas treatment unit (not illustrated).

During operation of the fuel cell device 100 the combustible gas flows through the combustible gas supply line 196 and the combustible gas supply opening 194 into the combustible gas channel 190 and is distributed from there through the intermediate spaces between the contact plates 118 and the respective fluid guiding frames 120 belonging to the same fuel cell unit 114 to the combustible gas chambers 124 of the fuel cell units 114 which are each surrounded by the contact plate 118, the fluid guiding frame 120 and the CAE unit 116 of the relevant fuel cell unit 114.

As already described, the combustible gas is oxidized at least partially at the anode 122 of the respective CAE unit 116 limiting the respective combustible gas chamber 124.

The product of oxidation (for example, water) passes together with superfluous combustible gas out of the combustible gas chambers 124 of the fuel cell units 114 into the waste gas channel 198, from which it is discharged through the waste gas discharge opening 202 and the waste gas discharge line 204 to the waste gas treatment unit (not illustrated).

In the waste gas treatment unit, the product of reaction (for example, water) is, for example, removed from the stream of waste gas and superfluous combustible gas is conducted to the combustible gas supply in order to be supplied again to the fuel cell device 100.

The oxidation agent required for the operation of the fuel cell device 100 (for example, air or pure oxygen) is supplied to the interior of the housing 102 through the oxidation agent supply line 104.

In the interior of the housing 102, the oxidation agent is distributed to the oxidation agent chambers 130 which are formed between the combustible gas chambers 124 of the fuel cell units 114 and which are surrounded by a respective contact plate 118 of a fuel cell unit 114 as well as by the fluid guiding frame 120 and the cathode 128 of the CAE unit 116 of an adjacent fuel cell unit 114.

The oxidation agent passes into the oxidation agent chambers and out of them again by way of the intermediate spaces between a respective fluid guiding frame 120 of a fuel cell unit 114 and the contact plate 118 of the fuel cell unit 114 following thereon in the stacking direction 112.

As already described, oxygen ions are formed from the oxidation agent at the cathodes 128 of the CAE units 116 of the fuel cell units 114 and these migrate through the electrolytes 126 to the anodes 122 of the CAE units 116 of the fuel cell units 114.

Superfluous oxidation agent passes out of the oxidation agent chambers 130 of the fuel cell units 114 on the exit side located opposite the entry side of the oxidation agent and is discharged from the interior of the housing 102 of the fuel cell device 100 through the oxidation agent discharge line 105.

The direction of flow of the combustible gas and the waste gas through the fuel cell device 100 is specified in the drawings with single arrows 210, the direction of flow of the oxidation agent through the fuel cell device 100 by means of double arrows 212.

The direction of flow of the oxidation agent through the oxidation agent chambers 130 is essentially at right angles to the direction of flow of the combustible gas through the combustible gas chambers 124.

In order to secure the fuel cell units 114 following one another along the stacking direction 112 against one another by way of external clamping, several connecting screws 214 are provided which pass through bores 216 in the end plates 108, 110 of the composite block of fuel cells 106 and are provided at their end facing away from the respective screw head 218 with an external thread 220, into which a respective coupling nut 222 is turned so that the end plates 108, 110 are clamped between the screw heads 218 and the connecting nuts 222 and a desired pressing force can be transferred via the end plates 108, 110 onto the stack of fuel cell units 114 (cf. FIG. 2).

The pressing force generated by the external clamping by means of the connecting screws 214 and connecting nuts 222 determines the contact pressure, with which the flange areas 136 of the contact plates 118 are pressed against the gas channel seals 188 on the fluid guiding frames 120.

The contact pressure, with which the fluid guiding frames 120 are pressed against the combustible gas chamber seals 186 on the CAE units 116, is, on the other hand,—irrespective of the external clamping by means of the connecting screws 214 and connecting nuts 222—determined exclusively by the elastic biasing force, with which the fluid guiding frame 120 of a fuel cell unit 114 is biased against the CAE unit 116 of the same fuel cell unit 114.

This elastic biasing is generated at the point of time, at which the fluid guiding frame 120 and the contact plate 118 of the same fuel cell unit 114 are secured against one another at the flange areas 136 and 168, respectively. This elastic biasing force is dependent on the geometry of the fuel cell units 114 and is brought about due to the fact that the sum of the extensions of a contact element 132a and the CAE unit 116 with the combustible gas chamber seal 186 arranged thereon in the stacking direction 112 is somewhat greater than the distance the underside of the inner edge area 178 of the fluid guiding frame 120 would take up from the central plane of the contact field 134 of the contact plate 118 in the non-deformed state of the fluid guiding frame 120. As a result of the CAE unit 116 clamped between the contact plate 118 and the fluid guiding frame 120, the fluid guiding frame 120 is deformed elastically which results in an elastic restoring force which biases the fluid guiding frame 120 against the CAE unit 116.

The composite block of fuel cells 106 described above is mounted as follows:

First of all, the individual fuel cell units 114 are mounted in that a CAE unit 116 is arranged each time between a contact plate 118 and a fluid guiding frame 120 and, subsequently, the flange areas 136 of the contact plate 118 abutting against one another as well as the flange area 168 of the fluid guiding frame 120 are connected to one another in a gas-tight manner, for example, by welding or soldering, in particular, hard soldering. Subsequently, the composite block of fuel cells 106 is assembled from the individual fuel cell units 114 in that the desired number of fuel cell units 114 is stacked along the stacking direction 112 and the fuel cell units 114 are fixed in their position relative to one another by means of the end plates 108, 110 and the connecting screws 214 and connecting nuts 222 bracing the end plates against one another.

A second embodiment of a fuel cell device 100 illustrated in FIG. 9 differs from the first embodiment described above in that the contact plates 118 do not merely abut on the fluid guiding frame 120' of an adjacent fuel cell unit 114 in the area of the gas channel seals 188 but rather are connected to this fluid guiding frame by way of flanging.

As is apparent from FIG. 9, the collar 158' of each fluid guiding frame 120' passes through the waste gas port 144 (or the combustible gas port 142) in the contact plate 118 of the adjacent fuel cell unit 114 and merges at a bending line 224 into a flange fold area 226 aligned at right angles to the stacking direction 112.

The gas channel seal 188' arranged on the side of the fluid guiding frame 120' facing the contact plate 118 is designed, in this second embodiment, not in one piece as in the first embodiment described above but in two pieces and comprises a first flat seal 228, which is arranged between the upper side of the seal contact area 126 of the fluid guiding frame 120' and the underside of the flange area 136 of the contact plate 118, and a second flat seal 230 which is arranged between the underside of the flange fold area 226 of the fluid guiding frame 120' and the upper side of the flange area 136 of the contact plate 118.

The flat seals 228, 230 may be designed as mica seals or as gas-tight, electrically insulating coatings (on the contact plate 118 or on the fluid guiding frame 120').

The flange fold area 226 on the fluid guiding frame 120' forms an undercut, as a result of which the contact plate 118 of the respectively adjacent fuel cell unit 114 is secured on the fluid guiding frame 120'.

In order to reduce the clearance between the contact plate 118 and the fluid guiding frame 120' at right angles to the stacking direction 112, a spacer ring consisting of an elastically insulating, preferably ceramic material can be arranged in the intermediate space between the edge of the flange area 136 of the contact plate and the collar 158' of the fluid guiding frame 120'.

In this second embodiment, the contact pressure at the gas channel seal 188' required for sealing the waste gas channel 198 and the combustible gas channel 190, respectively, is not first generated by the external clamping of the fuel cell units 114 against one another by means of the end plates 108, 110 and the connecting screws 214 and connecting nuts 222 arranged thereon but is already determined during the assembly of the stack consisting of fuel cell units 114 due to the flanging of the flange area 136 of each contact plate 118 to the fluid guiding frame 120' of the adjacent fuel cell unit 114.

As is apparent from FIG. 9, the inclined surface 146 between the contact field 134 and the flange area 136 of the contact plate 118 is dispensed with in this second embodiment and so the flange area 136 of the contact plate 118 is located approximately at the same level as the central plane 139 of the contact plate 118. Furthermore, the channel wall area 166' of the fluid guiding frame 120' is not, as in the first embodiment, aligned parallel to the stacking direction 112 but rather is inclined in relation to the stacking direction 112 through an angle of approximately 45°. Moreover, the extension of the channel wall area 166' along the stacking direction 112 is smaller than in the first embodiment.

The composite block of fuel cells 106 of the second embodiment of a fuel cell device 100 is preferably produced in accordance with the method described in the following:

First of all, several fluid guiding element-contact plate units are preassembled in that a fluid guiding frame 120' of a fuel cell unit 114 is connected each time to the contact plate 118 of an adjacent fuel cell unit by way of flanging in the area of the combustible gas channel 190 and the waste gas channel 198.

Subsequently, a stack consisting of fluid guiding element-contact plate units following one another along the stacking direction 112 is formed, wherein one respective CAE unit is arranged between two such units each time such that the cathode 128 of the relevant CAE unit 116 abuts on a fluid guiding frame 120' via the combustible gas chamber seal 186.

Furthermore, the stack consisting of the fluid guiding frame-contact plate units is formed such that each contact plate 118 abuts with its flange area 136 on the flange area 168 of the fluid guiding frame 120' of an adjacent fluid guiding frame-contact plate unit.

Subsequently, the flange areas 136 of the contact plates 118 are connected to the flange areas 168 of the respective fluid guiding frames 120' belonging to the same fuel cell unit 114 in a gas-tight manner, for example, by welding or by soldering, in particular, by hard soldering.

As for the rest, the second embodiment of a fuel cell device corresponds with respect to construction and operation to the first embodiment and in this respect reference is made to the preceding description thereof.

A third embodiment of a fuel cell device illustrated in FIG. 10 differs from the second embodiment described above in that the holding plates do not merely abut on the CAE units 116 in the area of the combustible gas chamber seal 186 but rather are connected to these CAE units 116 by way of flanging.

As is apparent from FIG. 10, in this embodiment a contact area 236 aligned at right angles to the stacking direction 112 adjoins the seal contact area 126 of the fluid guiding frame 120' along a bending line 234, this contact area abutting with its upper side areally on the underside of the seal contact area 126 and, for its part, merging at a bending line 238 into a channel wall area 166 aligned parallel to the stacking direction 112.

A flange fold area 240 adjoins the lower edge of the channel wall area 166 along a bending line 238, is aligned at right angles to the stacking direction 112 and abuts with its upper side on the underside of the support layer 121 of the CAE unit 116.

The flange fold area 240 on the fluid guiding frame 120' forms an undercut, as a result of which the CAE unit 116 is secured on the fluid guiding frame 120' of the same fuel cell unit 114.

In this third embodiment, the contact pressure at the combustible gas chamber seal 186 required for sealing the combustible gas chamber 124 is not—as in the first two embodiments—determined by the relative extensions of the contact elements 132 and the fluid guiding frame along the stacking direction 112 but is generated directly as a result of the flanging about the CAE unit 118 by the fluid guiding frame 120'.

As for the rest, the third embodiment of a fuel cell device corresponds with respect to construction and operation to the second embodiment and in this respect reference is made to its description above.

A fourth embodiment of a fuel cell device illustrated in FIG. 11 differs from the first embodiment described above in that the gas channel seal is not designed in the fourth embodiment—as in the first embodiment—as a flat seal acted upon with an external clamping force but rather as a slide fit sealing.

As is apparent from the sectional illustration of FIG. 11, the channel wall area 166 of the fluid guiding frame of the first embodiment which is aligned parallel to the stacking direction 112 is omitted in the case of the fluid guiding frame 120" of the fourth embodiment and so in the fourth embodiment the inner edge area 178 of the fluid guiding frame 120" merges directly into the seal contact area 162 of the fluid guiding frame 120" without any bending line. The seal contact area 162 merges at its edge facing away from the inner edge area 178 along a bending line 242 into a channel wall area 244 which is aligned parallel to the stacking direction 112 and, on the other hand, merges at its upper edge facing away from the seal contact area 162 along a bending line 246 into a shoulder area 248 which is aligned essentially at right angles to the stacking direction 112 and is directed into the respective port 154 or 156.

The contact plate 118' has in this fourth embodiment, in contrast to the contact plate of the first embodiment, at each of the ports 142 and 144 a collar 250 which surrounds the relevant port in a ring shape, is aligned essentially parallel to the stacking direction 112 and borders along a bending line 252 on the respectively adjacent inclined surface 146 and the flange area 136 of the contact plate 118', respectively.

As is apparent from FIG. 11, a respective spacer element 252 surrounding the channel wall area 244 in a ring shape is arranged on the upper side of the seal contact area 162 and on the outer side of the channel wall area 244 of each fluid guiding frame 120", this spacer element having an essentially L-shaped cross section with a first arm 254, which rests on the seal contact area 162 and is aligned essentially at right angles to the stacking direction 112, and with a second arm 256 which rests on the outer side of the channel wall area 244 and is aligned essentially parallel to the stacking direction 112.

The first arm 254 of the spacer element 252 serves as a distance piece between the collar 250 of the contact plate 118' and the seal contact area 162 of the holding plate 120".

The second arm 256 of the spacer element 252 serves as a distance piece between the collar 250 of the contact plate 118' and the channel wall area 244 of the fluid guiding frame 120".

The spacer element 252 consists of an electrically insulating material which is rigid and resistant at the operating temperature of the fuel cell device 100 of, for example, approximately 850° C.

The spacer element 252 can, for example, be formed from $Al_2O_3$.

The second arm 256 of the spacer element 252 supports a sealing bead 256 which surrounds the channel wall area 244 of the fluid guiding frame 120" in a ring shape and closes the gap between the channel wall area 244 and the collar 250 of the contact plate 118'.

The sealing bead 258 consists of an electrically non-conductive material which is viscous but chemically resistant at the operating temperature of the fuel cell device 100 of, for example, approximately 850° C.

A solder glass or an amorphous material similar to glass can be; considered, in particular, as material for the sealing bead 256.

If the sealing bead 258 is formed from a solder glass, it can be produced by applying a paste containing powdered glass.

When the operating temperature of the fuel cell device 100 is reached, the melted sealing bead 258 fills the gap between the collar 250 of the contact plate 118' and the channel wall area 244 of the fluid guiding frame 120" in a gas-tight manner.

Possible differences in pressure between the combustible gas chamber 124 and the oxidation agent chamber 130 or different heat expansions are compensated by a displacement of the collar 250 of the contact plate 118' relative to the fluid guiding frame 120".

This is possible without more ado since the contact plate 118' and the fluid guiding frame 120" are, in this embodiment, not rigidly connected to one another but rather the collar 250 of the contact plate 118' and the holding plate 120" are displaceable relative to one another along the stacking direction 112, namely by the distance, by which the second arm 256 of the spacer element 252 projects beyond its first arm 254 along the stacking direction 112. If the collar 250 is displaced relative to the fluid guiding frame 120" proceeding from the initial position illustrated in FIG. 11 along the stacking direction 112 upwards, the melted sealing bead 258 continues to provide for a gas-tight sealing between the contact plate 118' and the fluid guiding frame 120" while the spacer element 252 prevents the viscous mass of the sealing bead 258 from running out into the oxidation agent chamber 130.

The contact plate 118' and the fluid guiding frame 120" are also displaceable relative to one another at right angles to the stacking direction 112, namely by the distance, by which the first arm 254 of the spacer element 252 projects beyond its second arm 256 at right angles to the stacking direction 112. If the collar 250 is displaced relative to the fluid guiding frame 120" proceeding from the initial position illustrated in FIG. 11 at right angles to the stacking direction 112, the melted sealing bead 258 continues to provide for a gas-tight sealing between the contact plate 118' and the fluid guiding frame 120".

Such a slide fit sealing at the combustible gas channel 190 and the waste gas channel 198 is particularly suitable for compensating for differences between the individual components of the fuel cell units 114 (CAE unit 116, contact plate 118' and fluid guiding frame 120") with respect to their thermal coefficients of expansion.

Since no predetermined contact pressure is required for the slide fit sealing, it is also not necessary with this fourth embodiment—in the same way as with the second and the third embodiments—to brace the fuel cell units 114 of the composite block of fuel cells 106 against one another. It is merely necessary for the fuel cell units to be fixed in their position relative to one another and for an adequate contact pressure to be generated between the CAE units and the contact plates.

To produce the composite block of fuel cells 106 of the fourth embodiment the procedure is preferably—as with the first embodiment—such that first of all the individual fuel cell units 114 are connected to one another by way of a gas-tight connection of the contact plate 118' and the fluid guiding frame 120" of the same fuel cell unit 114 and, subsequently, the assembled fuel cell units 114 are stacked on top of one another along the stacking direction 112.

As for the rest, the fourth embodiment of a fuel cell device corresponds with respect to construction and operation to the first embodiment and in this respect reference is made to its description above.

A fifth embodiment of a fuel cell device illustrated in FIG. 12 differs from the fourth embodiment described above in that apart from the gas channel seal 188" in the fourth embodiment the combustible gas chamber seal 186' is also designed as a slide fit sealing.

As is apparent from the sectional illustration of FIG. 12, a sloping wall area 262, which is inclined at an angle of approximately 45° in relation to the stacking direction 112 and merges into a wall area 266 curved in an S shape along a bending line 264 at its lower edge facing away from the seal contact area 162, borders on the seal contact area 162 along a bending line 260 in the case of the fluid guiding frame 120" of the fifth embodiment. The wall area 266 curved in an S shape borders, for its part, at its upper edge facing away from the sloping wall area 262 on the inner edge area 178 of the fluid guiding frame 120".

As is apparent from FIG. 12, a respective spacer element 270 surrounding the CAE unit 116 in a ring shape is arranged on the underside of the inner edge area 178 and on the side wall 268 of the CAE unit 116, this spacer element having an essentially L-shaped cross section with a first arm 272, which abuts on the side wall 268 of the CAE unit 116 and is aligned essentially parallel to the stacking direction 112, and with a second arm 274 which abuts on the upper side of the CAE unit 116 and on the underside of the inner edge area 178 of the fluid guiding frame 120" and is aligned essentially at right angles to the stacking direction 112.

The first arm 272 of the spacer element 270 serves as a distance piece between the CAE unit 116 and the curved wall area 266 of the fluid guiding frame 120". The second arm 274 of the spacer element 270 serves as a distance piece between the CAE element 116 and the inner edge area 178 of the fluid guiding frame 120".

The distance element 270 also consists of an electrically insulating material which is rigid and resistant at the operating temperature of the fuel cell device 100 of, for example, approximately 850° C., for example, of $Al_2O_3$.

A sealing element 276 closed in a ring shape is arranged along the inner edge of the second arm 274 of the spacer element 270 and consists of an electrically non-conductive material which is viscous but chemically resistant at the operating temperature of the fuel cell device 100 of, for example, approximately 850° C.

A solder glass or an amorphous material similar to glass can be considered, in particular, as material for the sealing element 276.

If the sealing element 276 is formed from a solder glass, it may be produced by applying a paste containing powdered glass to the upper side of the CAE element 116, for example, with the screen printing method.

Once the operating temperature of the fuel cell device 100 is reached, the melted sealing element 276 fills the entire intermediate space between the inner edge area 178 of the fluid guiding frame 120" and the CAE element 116 in a gas-tight manner.

Possible differences in pressure between the combustible gas chamber 124 and the oxidation agent chamber 130 or differences with respect to the heat expansion of the individual components of the fuel cell units 114 are compensated by a relative displacement between the CAE unit 116 and the fluid guiding frame 120".

This is possible without further ado since the CAE unit 116 and the fluid guiding frame 120" are not rigidly connected to one another but are displaceable relative to one another at right angles to the stacking direction 112, namely by the distance, by which the second arm 274 of the spacer element 270 projects beyond its first arm 272 at right angles to the stacking direction 112.

If the CAE unit 116 is displaced relative to the fluid guiding frame 120" proceeding from the initial position illustrated in FIG. 12 at right angles to the stacking direction 112 to the left, the melted sealing element 276 continues to provide for a gas-tight sealing between the CAE unit 116 and the fluid guiding frame 120" while the spacer element 270 prevents the viscous mass of the sealing element 276 from running out into the combustible gas chamber 124.

Such a slide fit sealing between the combustible gas chamber 124 and the oxidation agent chamber 130 is particularly suitable for compensating for any difference between the individual components of the fuel cell units 114 (CAE unit 116, contact plate 118' and fluid guiding frame 120") with respect to their thermal coefficients of expansion.

As for the rest, the fifth embodiment of a fuel cell device corresponds with respect to construction and operation to the fourth embodiment and in this respect reference is made to its description above.

The invention claimed is:

1. Composite block of fuel cells, comprising a plurality of fuel cell units, said fuel cell units following one another along a stacking direction and each comprising:

a cathode-anode-electrolyte unit, a contact plate in electrically conductive contact with the cathode-anode-electrolyte unit, and a fluid guiding element comprising a one-piece shaped sheet metal part and connected to the contact plate in a fluid-tight manner, wherein said one-piece shaped sheet metal part is provided with a fluid supply channel opening and a fluid discharge channel opening in fluid guiding areas of said one-piece shaped sheet metal part to which the electrolyte of the cathode-anode-electrolyte unit does not extend, said fluid supply channel opening forming a part of a fluid supply channel which extends through the fuel cell unit parallel to a stacking direction and which does not pass through the electrolyte of the cathode-anode-electrolyte unit and said fluid discharge channel opening forming a part of a fluid discharge channel which extends through the fuel cell unit parallel to a stacking direction and which does not pass through the electrolyte of the cathode-anode-electrolyte unit, wherein the fluid supply channel opening and the fluid discharge channel opening enable a fluid to flow from said fluid supply channel opening through said fuel cell unit to said fluid discharge channel opening, and wherein said one-piece shaped sheet metal part is connected to the contact plate by an electrically conductive metallic connection.

2. Composite block of fuel cells as defined in claim 1, wherein the cathode-anode-electrolyte unit is arranged on the fluid guiding element.

3. Composite block of fuel cells as defined in claim 1, wherein the contact plate is designed as a shaped sheet metal part.

4. Composite block of fuel cells as defined in claim 1, wherein the fluid guiding element and the contact plate are connected to one another by laser welding or by electron beam welding or by hard soldering.

5. Composite block of fuel cells as defined in claim 1, wherein the fluid guiding element has an opening for the passage of contact elements to the cathode-anode-electrolyte unit.

6. Composite block of fuel cells as defined in claim 1, wherein the fluid guiding element abuts on the cathode-anode-electrolyte unit via an electrically insulating seal.

7. Composite block of fuel cells as defined in claim 6, wherein the seal comprises mica.

8. Composite block of fuel cells as defined in claim 6, wherein the seal comprises a flat seal.

9. Composite block of fuel cells as defined in claim 6, wherein the seal comprises a coating on at least one of the fluid guiding element and the cathode-anode-electrolyte unit.

10. Composite block of fuel cells as defined in claim 1, wherein the cathode-anode-electrolyte unit and the fluid guiding element are biased elastically against one another.

11. Composite block of fuel cells as defined in claim 1, wherein the fuel cell unit comprises an electrically insulating fluid channel seal, the contact plate of the fuel cell unit abutting on the fluid guiding element of an adjacent fuel cell unit via said seal.

12. Composite block of fuel cells as defined in claim 1, wherein the fuel cell unit comprises a fluid channel seal, the fluid guiding element of the fuel cell unit abutting on the contact plate of an adjacent fuel cell unit via said seal.

13. Composite block of fuel cells as defined in claim 12, wherein the fluid channel seal comprises a coating on at least one of the fluid guiding element and the contact plate.

14. Composite block of fuel cells as defined in claim 12, wherein the fluid channel seal comprises a flat seal.

15. Composite block of fuel cells as defined in claim 12, wherein the fluid channel seal comprises at least two separate sealing elements.

16. Composite block of fuel cells as defined in claim 12, wherein the fluid channel seal comprises a slide fit sealing.

17. Composite block of fuel cells as defined in claim 12, wherein the fluid channel seal comprises a material viscous at the operating temperature of the fuel cell unit.

18. Composite block of fuel cells as defined in claim 1, wherein the composite block of fuel cells comprises at least one clamping element for bracing the fuel cell units against one another.

19. Composite block of fuel cells as defined in claim 18, wherein the composite block of fuel cells comprises two end plates adapted to be braced against one another by means of the clamping element.

20. Composite block of fuel cells as defined in claim 19, wherein at least one of the end plates has at least one fluid port.

21. Composite block of fuel cells as defined in claim 1, wherein the fluid guiding element of at least one of the fuel cell units is connected to the contact plate of an adjacent fuel cell unit by way of flanging.

22. Composite block of fuel cells as defined in claim 21, wherein a flange fold area engaging around the contact plate of the adjacent fuel cell unit is formed on the fluid guiding element of at least one of the fuel cell units.

23. Composite block of fuel cells as defined in claim 22, wherein an electrically insulating fluid channel seal is arranged between the flange fold area and the contact plate of the adjacent fuel cell unit.

24. Composite block of fuel cells as defined in claim 1, wherein the cathode-anode-electrolyte unit is held between the fluid guiding element and the contact plate.

25. Composite block of fuel cells as defined in claim 17, wherein the fluid channel seal comprises a solder glass.

26. Composite block of fuel cells as defined in claim 1, wherein said fluid guiding element and said contact plate form a two-part shell surrounding said cathode-anode-electrolyte unit of the fuel cell unit.

27. Composite block of fuel cells as defined in claim 1, further comprising an electrically insulating fluid channel seal arranged between the contact plate of the fuel cell unit and the fluid guiding element of an adjacent fuel cell unit or between the fluid guiding element of the fuel cell unit and the contact plate of an adjacent fuel cell unit, said fluid channel seal surrounding a fluid port provided in the fluid guiding element or a fluid port provided in the contact plate and said fluid channel seal being spaced apart from the electrolyte of the cathode-anode-electrolyte unit of the fuel cell unit.

28. Composite block of fuel cells as defined in claim 1, wherein said fluid guiding element forms a boundary of a fluid chamber having fluid flowing through it during operation of the fuel cell unit.

29. Composite block of fuel cells as defined in claim 1, wherein said fluid guiding element is connected to the contact plate by way of welding or by way of soldering.

30. Composite block of fuel cells as defined in claim 1, wherein said fluid guiding element and said contact plate define therebetween a fluid chamber having a combustible gas or an oxidation agent flowing through it during operation of the fuel cell unit.

31. Composite block of fuel cells, comprising a plurality of fuel cell units, said fuel cell units following one another along a stacking direction and each comprising:

a cathode-anode-electrolyte unit, a contact plate in electrically conductive contact with the cathode-anode-electrolyte unit, and a fluid guiding element comprising a one-piece shaped sheet metal part and connected to the contact plate in a fluid-tight manner, said one-piece shaped sheet metal part having a contact opening for the passage of contact elements arranged on a contact plate of an adjacent fuel cell unit to the cathode-anode-electrolyte unit of the fuel cell unit, wherein said one-piece shaped sheet metal part is provided with a fluid supply channel opening and with a fluid discharge channel opening, enabling a fluid to flow from said fluid supply channel opening through said fuel cell unit to said fluid discharge channel opening, and wherein said one-piece shaped sheet metal part is connected to the contact plate in an electrically conductive manner.

32. Composite block of fuel cells as defined in claim 31, wherein the cathode-anode-electrolyte unit is arranged on the fluid guiding element.

33. Composite block of fuel cells as defined in claim 31, wherein the contact plate is designed as a shaped sheet metal part.

34. Composite block of fuel cells as defined in claim 31, wherein the fluid guiding element and the contact plate are connected to one another by laser welding or by electron beam welding or by hard soldering.

35. Composite block of fuel cells as defined in claim 31, wherein the fluid guiding element has an opening for the passage of contact elements to the cathode-anode-electrolyte unit.

36. Composite block of fuel cells as defined in claim 31, wherein the fluid guiding element abuts on the cathode-anode-electrolyte unit via an electrically insulating seal.

37. Composite block of fuel cells as defined in claim 36, wherein the seal comprises mica.

38. Composite block of fuel cells as defined in claim 36, wherein the seal comprises a flat seal.

39. Composite block of fuel cells as defined in claim 36, wherein the seal comprises a coating on at least one of the fluid guiding element and the cathode-anode-electrolyte unit.

40. Composite block of fuel cells as defined in claim 31, wherein the cathode-anode-electrolyte unit and the fluid guiding element are biased elastically against one another.

41. Composite block of fuel cells as defined in claim 31, wherein the fuel cell unit comprises an electrically insulating fluid channel seal, the contact plate of the fuel cell unit abutting on the fluid guiding element of an adjacent fuel cell unit via said seal.

42. Composite block of fuel cells as defined in claim 31, wherein the fuel cell unit comprises a fluid channel seal, the fluid guiding element of the fuel cell unit abutting on the contact plate of an adjacent fuel cell unit via said seal.

43. Composite block of fuel cells as defined in claim 42, wherein the fluid channel seal comprises a coating on at least one of the fluid guiding element and the contact plate.

44. Composite block of fuel cells as defined in claim 42, wherein the fluid channel seal comprises a flat seal.

45. Composite block of fuel cells as defined in claim 42, wherein the fluid channel seal comprises at least two separate sealing elements.

46. Composite block of fuel cells as defined in claim 42, wherein the fluid channel seal comprises a slide fit sealing.

47. Composite block of fuel cells as defined in claim 42, wherein the fluid channel seal comprises a material viscous at the operating temperature of the fuel cell unit.

48. Composite block of fuel cells as defined in claim 31, wherein the composite block of fuel cells comprises at least one clamping element for bracing the fuel cell units against one another.

49. Composite block of fuel cells as defined in claim 48, wherein the composite block of fuel cells comprises two end plates adapted to be braced against one another by means of the clamping element.

50. Composite block of fuel cells as defined in claim 49, wherein at least one of the end plates has at least one fluid port.

51. Composite block of fuel cells as defined in claim 31, wherein the fluid guiding element of at least one of the fuel cell units is connected to the contact plate of an adjacent fuel cell unit by way of flanging.

52. Composite block of fuel cells as defined in claim 51, wherein a flange fold area engaging around the contact plate of the adjacent fuel cell unit is formed on the fluid guiding element of at least one of the fuel cell units.

53. Composite block of fuel cells as defined in claim 52, wherein an electrically insulating fluid channel seal is arranged between the flange fold area and the contact plate of the adjacent fuel cell unit.

54. Composite block of fuel cells as defined in claim 31, wherein the cathode-anode-electrolyte unit is held between the fluid guiding element and the contact plate.

55. Composite block of fuel cells as defined in claim 47, wherein the fluid channel seal comprises a solder glass.

56. Composite block of fuel cells as defined in claim 31, wherein said fluid guiding element and said contact plate form a two-part shell surrounding said cathode-anode-electrolyte unit of the fuel cell unit.

57. Composite block of fuel cells as defined in claim 31, further comprising an electrically insulating fluid channel seal arranged between the contact plate of the fuel cell unit and the fluid guiding element of an adjacent fuel cell unit or between the fluid guiding element of the fuel cell unit and the contact plate of an adjacent fuel cell unit, said fluid channel seal surrounding a fluid port provided in the fluid guiding element or a fluid port provided in the contact plate and said fluid channel seal being spaced apart from the electrolyte of the cathode-anode-electrolyte unit of the fuel cell unit.

58. Composite block of fuel cells as defined in claim 31, wherein said fluid guiding element forms a boundary of a fluid chamber having fluid flowing through it during operation of the fuel cell unit.

59. Composite block of fuel cells as defined in claim 31, wherein said fluid guiding element is connected to the contact plate by way of welding or by way of soldering.

60. Composite block of fuel cells as defined in claim 31, wherein said fluid guiding element and said contact plate define therebetween a fluid chamber having a combustible gas or an oxidant agent flowing through it during operation of the fuel cell unit.

* * * * *

UNITED STATES PATENT AND TRADEMARK OFFICE
CERTIFICATE OF CORRECTION

| | | |
|---|---|---|
| PATENT NO. | : 7,811,695 B2 | Page 1 of 1 |
| APPLICATION NO. | : 12/316421 | |
| DATED | : October 12, 2010 | |
| INVENTOR(S) | : Armin Diez | |

It is certified that error appears in the above-identified patent and that said Letters Patent is hereby corrected as shown below:

Column 20, Claim 31, line 2, remove --and-- between "part" and "connected".

Signed and Sealed this
Twenty-eighth Day of December, 2010

David J. Kappos
*Director of the United States Patent and Trademark Office*